US012323200B2

(12) United States Patent
Zhang et al.

(10) Patent No.: US 12,323,200 B2
(45) Date of Patent: Jun. 3, 2025

(54) METHOD FOR UE COORDINATION BASED BEAM MANAGEMENT

(71) Applicant: APPLE INC., Cupertino, CA (US)

(72) Inventors: Yushu Zhang, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/426,568

(22) Filed: Jan. 30, 2024

(65) Prior Publication Data
US 2024/0171228 A1 May 23, 2024

Related U.S. Application Data

(63) Continuation of application No. 17/593,194, filed as application No. PCT/CN2021/076736 on Feb. 18, 2021, now Pat. No. 11,929,794.

(51) Int. Cl.
*H04B 7/0408* (2017.01)
*H04W 24/10* (2009.01)

(52) U.S. Cl.
CPC .......... *H04B 7/0408* (2013.01); *H04W 24/10* (2013.01)

(58) Field of Classification Search
CPC .... H04B 7/0408; H04B 7/022; H04B 7/0695; H04W 24/10
See application file for complete search history.

(56) References Cited

U.S. PATENT DOCUMENTS

| 2020/0106510 | A1 | 4/2020 | Song et al. |
| 2020/0351895 | A1 | 11/2020 | Huang |
| 2020/0359435 | A1 | 11/2020 | Raghavan et al. |
| 2022/0141676 | A1* | 5/2022 | Wang .................. H04W 72/02 370/329 |

(Continued)

FOREIGN PATENT DOCUMENTS

| CN | 110999178 A | 4/2020 |
| WO | 2020186097 A1 | 9/2020 |

OTHER PUBLICATIONS

U.S. Appl. No. 17/593,194, Non-Final Office Action, Aug. 3, 2023, 11 pages.

(Continued)

*Primary Examiner* — Sung S Ahn
(74) *Attorney, Agent, or Firm* — Dorsey & Whitney LLP

(57) ABSTRACT

Performing user equipment (UE) coordination based beam management may include determining resources for measuring beams and reporting measured beam information. The resources may be configured for a first user equipment (UE) of a plurality of coordinated UEs. The determined resources may be transmitted to the first UE via radio resource control (RRC) or medium access control-control element (MAC CE). Measured beam information received from the first UE for configuring beam sharing between multiple UEs of the plurality of coordinated UEs may be decoded.

18 Claims, 17 Drawing Sheets

(56) References Cited

U.S. PATENT DOCUMENTS

2022/0394725 A1* 12/2022 Wang .................. H04W 76/14

OTHER PUBLICATIONS

U.S. Appl. No. 17/593,194, Notice of Allowance, Nov. 29, 2023, 8 pages.
Mediatek Inc., "Enhancements on multi-beam operations", R1-1912135, 3GPP TSG RAN WG1 #99, Reno, Nevada, USA, Agenda Item 7.2.8.3, 10 pages.
PCT/CN2021/076736, International Search Report and Written Opinion, Nov. 19, 2021, 9 pages.

* cited by examiner

METHOD FOR UE COORDINATION BASED BEAM MANAGEMENT

TECHNICAL FIELD

This application relates generally to wireless communication systems, including beam sharing in a user equipment coordinated environment.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In 3GPP Release-15, Release-16, and Release-17, beam management is performed in a UE-dedicated manner. In particular, each UE may independently perform measurements and beam reporting based on such measurement results. Base stations (e.g., gNBs) may likewise use UE-dedicated signaling to update the transmission configuration indicator (TCI) state or uplink spatial relation info for each given UE. In addition, a UE-dedicated beam failure recovery (BFR) procedure can be performed in a UE-dedicated manner for any given UE to recover from beam failure. Such UE-dedicated beam management procedures may take too much system overhead, particularly as the number of UEs increase.

Figure 1:
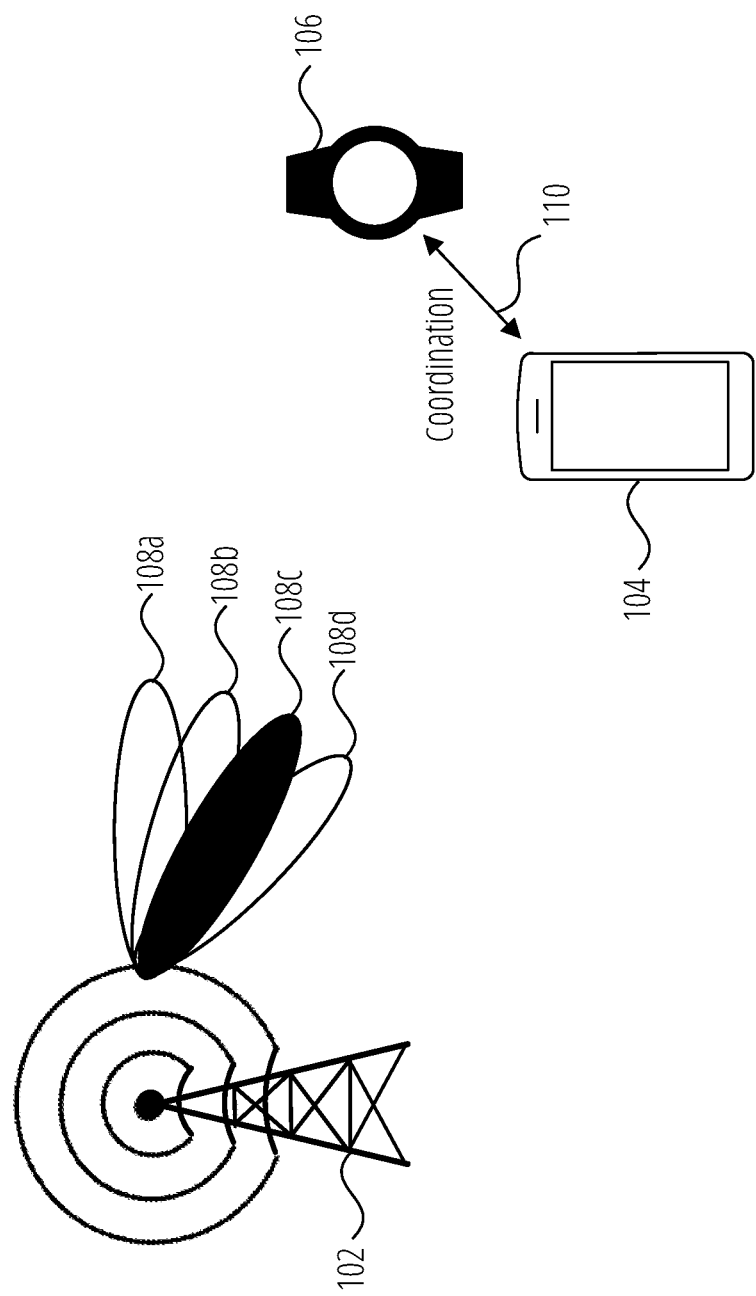
FIG. 1 illustrates a UE coordination environment for beam sharing in accordance with one embodiment.

Notably, some UEs are capable of sharing the same network beam with other UEs when the UEs are in a similar location and there is some coordination between the UEs. In some embodiments, such a group of coordinated UEs may also have the same owner/user. Such groups of coordinated UEs may also include any number of applicable UEs and as few as two UEs). In an example, FIG. 1 illustrates a base station 102 generating beams 108 (i.e., beam 108a through beam 108d), including the beam 108c, which is solid black to represent that it is the beam that will be shared by multiple UEs. Accordingly, FIG. 1 also includes a UE 104 (e.g., a smartphone) and a UE 106 (e.g., a smartwatch) that are capable of coordinating to share the same network beam (i.e., the beam 108c), as shown by arrow 110.

Using such coordination between UEs, the issues described above may be minimized. Accordingly, the principles described herein provide disclosure that supports UE-coordinated beam management to overcome these issues. For instance, the principles described herein provide solutions associated with 1. UE-coordinated beam reporting; 2. Beam indication for coordinated-UEs; and 3. UE-coordinated beam failure recovery.

Regarding UE-coordinated beam reports, a UE may report to a base station (e.g., a gNB) whether the UE is capable of operating in coordinated mode with other UEs by higher layer signaling (e.g., radio resource control (RRC) or medium access control-control element (MAC CE)). In such situations, the UE may report the UE ID (e.g., cell radio network temporary identifier (C-RNTI)) of a given UE with which the reporting UE can coordinate (i.e., coordinated UEs).

The principles described herein include three different coordinated modes for the group of coordinated UEs, as follows: 1. Mode 1, which includes a single UE performing beam measurements and reporting regarding all beams; 2. Mode 2, which includes each of the coordinated UEs separately performing beam measurements and separately reporting on one or more network beams; and 3. Mode 3, which includes each of the coordinated UEs separately performing beam measurements while the beam report (e.g., layer 1-reference signal received power/layer 1-signal-to-interference and noise ratio (L1-RSRP/L1-SINR)) is reported by a single UE of the coordinated UEs. Notably, the coordination mode may be configured by higher layer signaling or reported by a UE. In addition, when using Mode 3, each UE of the group of coordinated UEs may provide beam measurement information to the UE selected for reporting to the base station (note the UE selected for reporting may report only a subset of the performed beam measurement information to the base station).

Regarding coordinated Mode 1 referenced above, a base station (e.g., gNB) can enable the beam measurement and report for one UE within the group of UEs. Mode 1 may include the following two options: 1. The base station may configure beam measurement and report resources for a single UE from the group of coordinated UEs by higher layer signaling (e.g., RRC or MAC CE); or 2. The base station may configure beam measurement and report resources for each UE of the group of coordinated UEs by higher layer signaling (e.g. RRC or MAC CE). With respect to option 2 of Mode 1, the base station may then dynamically enable or disable the beam measurement and report for any UE by higher layer signaling (e.g., RRC or MAC CE). In other words, option 2 of Mode 1 may allow the base station to dynamically indicate the particular UE that is to perform beam measurement and reporting because all of the UEs in the group of coordinated UEs have already been configured by the base station to perform such tasks. In addition, for the other UEs (i.e., the UE's not comprising the single UE that will be measuring and reporting to the base station) from the group of coordinated UEs, if the beam measurement resources are configured, the resources may not take any achannel state information (CSI) processing unit (CPU) (see 3GPP TS 38.214 Section 5.2.1.6) when Mode 1 is enabled. In other words, from the UE perspective, no resources will be utilized by the other UEs not performing measurements/reporting despite being configured to measure/report by the base station.

Figure 2:
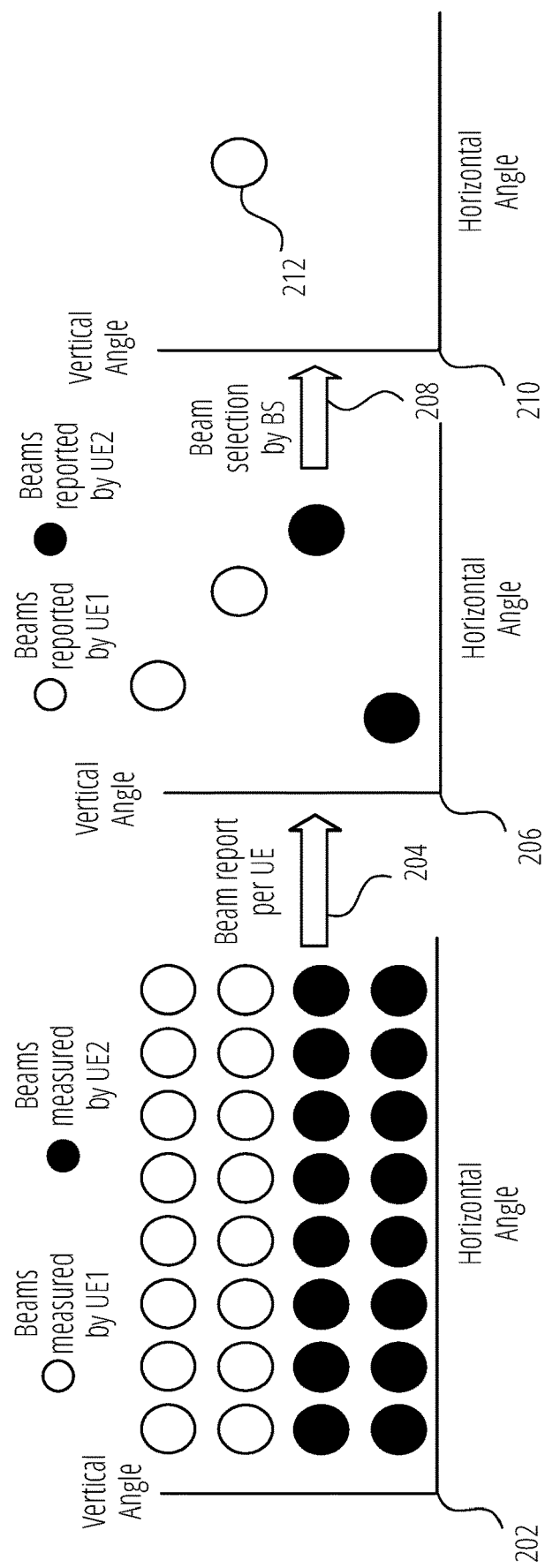
FIG. 2 illustrates an example embodiment of determining a beam for sharing in a UE coordinated environment in accordance with one embodiment.

Regarding coordinated Mode 2 referenced above, a base station (e.g., a gNB) may configure the beam measurement and report for each UE within the group of coordinated UEs. Mode 2 may include the following two options: 1. The base station may configure a subset of resources for beam measurement and report for each UE within the group of coordinated UEs by higher layer signaling (e.g., RRC or MAC CE). In other words, the base station may configure each UE within the group of coordinated UEs to measure only a subset of the total beams and provide a report on the indicated subset of beams (as shown in FIG. 2); or 2. The base station may configure all resources for beam measurement and report for each UE by higher layer signaling (e.g., RRC or MAC CE). With respect to option 2 of Mode 2, the base station may enable or disable some resources for beam measurement for one or more UEs from the group of coordinated UEs by MAC CE or downlink control information (DCI) to allow for dynamically changing the load of beam measurements for each UE. In other words, the base station may dynamically reduce or increase the number of beams to be measured and reported for any given UE of the group of coordinated UEs. In addition, for CPU occupation calculation, only the enabled resources for beam measurement and reporting may be considered in such calculations.

Furthermore, for both option 1 and option 2 of Mode 2, the beams measured and reported by any UEs within the coordinated UE group can be used to determine a known or unknown status for a TCI (see 3GPP TS 38.133 Section 8.10.2) for a beam for all UEs within the group. As such, each beam measured by a first UE of a group of coordinated UEs may be known to a second UE of the group of UEs and vice versa. The same principle is true regardless of the number of UEs within a group of coordinated UEs such that each beam measured by any UE within the group is considered known by all the UEs of the group.

FIG. 2 illustrates an example embodiment of determining an appropriate beam for sharing between multiple UEs in accordance with option 1 of Mode 2 described above (and potentially option 2 of Mode 2, as well). As shown, FIG. 2 includes a series of graphs each having a vertical angle associated with the y-axis and horizontal angle associated with the x-axis. The first graph comprises a measured beams graph 202 that includes a set of white circles associated with beams to be measured by a first UE (i.e., UE1) and a set of black circles associated with beams to be measured by a second UE (i.e., UE2).

As illustrated, FIG. 2 also includes an arrow 204, which represents a transition to reported beams graph 206. The reported beams graph 206 includes a subset of white circles (i.e., a subset of the beams measured by UE1 in reported beams graph 206) associated with beams reported by UE1 and a subset of black circles (i.e., a subset of the beams measured by UE2 in reported beams graph 206) associated with beams reported by UE2.

As shown, FIG. 2 also includes an arrow 208, which represents a transition to selected beam graph 210. The selected beam graph 210 includes a single beam (i.e., selected beam 212) selected by a base station from the subset of beams reported by UE1 and UE2. The selected beam 212 may then be shared by coordinated UEs UE1 and UE2.

Regarding coordinated Mode 3 referenced above, a base station (e.g., a gNB) may configure beam measurement resources for each UE within the group of coordinated UEs. In addition, the base station may configure the CSI-reportConfig (see 3GPP TS 38.331 Section 6.3.2) for each UE within the group of coordinated UEs by RRC. However, the base station may trigger/indicate a single reporting UE corresponding to a report resource for CSI-reportConfig such that only the reporting UE will report beam measurement information. As such, non-reporting UEs within the group of coordinated UEs may share beam measurement information with the reporting UE to be reported to the base station.

With respect to Mode 3, the base station may utilize various signaling possibilities for reporting configuration. In an example, for a periodic report, the base station can configure the reporting UE ID (i.e., configure the particular reporting UE having a particular UE ID) and resource by RRC. In another example, for a semi-persistent report, the base station can configure the reporting UE ID and resource by RRC or MAC CE. In yet another example, for an aperiodic report, the base station can configure the reporting UE ID and resource by RRC, MAC CE, or DCI. Notably, the minimal delay Z and Z' for CSI reporting (see 3GPP TS 38.214 Section 5.4) may include consideration of the minimal processing delay Z and Z' in addition to any UE coordination latency. With respect to such considerations, UEs may report the applicable minimal latency for UE coordination to the base station. In this way, the base station may determine an appropriate amount of time for expecting to receive a beam report after configuring the reporting UE.

As briefly discussed above, the principles described herein include solutions related to beam indication for coordinated UEs. In particular, two options related to beam indication for coordinated UEs are discussed herein. The first option provided for beam indication for coordinated UEs includes the base station (e.g., gNB) sending TCI/spatial relation information update signaling (i.e., beam indication information) to one UE within the group of coordinated UEs and the one UE forwarding such information to the other UEs within the group of coordinated UEs. In such embodiments, the signaling may be carried by MAC CE or DCI and each UE within the group of coordinated UEs may update the beams based on the indicated TCI/spatial relation information. In addition, the minimal delay for any UEs that did not receive such signaling directly can be determined by the minimal processing delay and minimal UE coordination delay, which can be reported based on the UE capability of such UEs.

Figure 3:
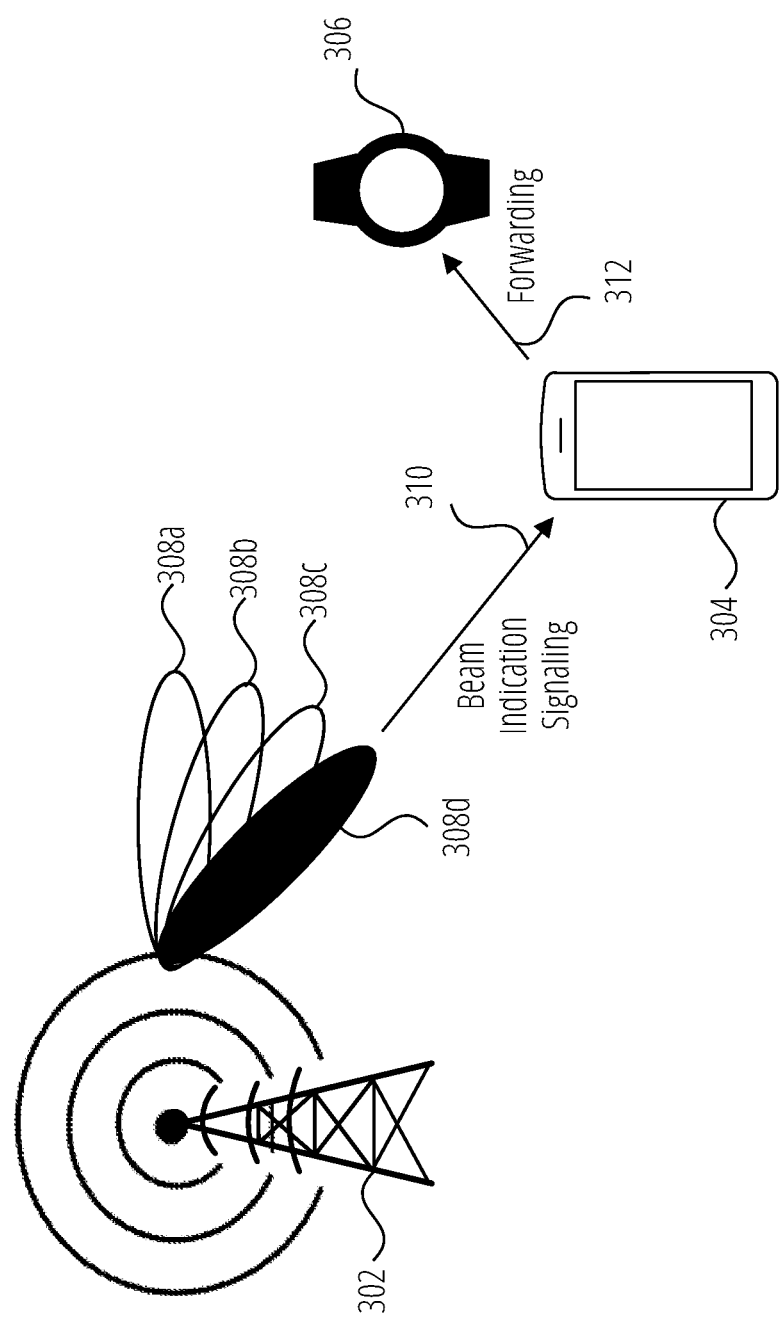
FIG. 3 illustrates a UE coordination environment for beam sharing in accordance with one embodiment.

FIG. 3 illustrates an example of beam indication representing the first option described above. As shown, FIG. 3 includes a base station 302 generating beams 308 (i.e., beam 308a through beam 308d), including the beam 308d, which is solid black to represent that it is the beam that will be shared by multiple UEs. Accordingly, FIG. 3 also includes a UE 304 (e.g., a smartphone) and a UE 306 (e.g., a smartwatch) that are capable of coordinating to share the same network beam (i.e., the beam 308d). As shown, FIG. 3 also includes arrow 310 representing that beam indication signaling by the base station 302 is limited to the UE 304, while arrow 312 represents that the UE 304 forwards information associated with the beam indication signaling received from the base station 302 to the UE 306.

The second option for beam indication for coordinated UEs includes the base station (e.g., gNB) sending TCI/spatial relation information update signaling (i.e., beam indication information) to all UEs within the group of coordinated UEs. In such embodiments, the signaling may be carried by DCI or MAC CE, which may be based on a RNTI configured for the group of UEs. With respect to MAC CE-based operations, a physical downlink shared channel (PDSCH) may be utilized for carrying the MAC CE, which may be scheduled by a group-based physical downlink control channel (PDCCH) that can be decoded by each UE within the group of coordinated UEs.

Within the second option, the UEs may also report ACK/NACK for the DCI or MAC CE with the following two options: 1. The ACK/NACK can be reported by one UE, which is selected via higher layer signaling or DCI by the base station (the first option is also referred to as option 2-1). The first option also includes two options as follows: a. The UE can report whether all UEs within the group of coordinated UEs have received the beam indication signal correctly; and b. The UE can report whether it has received the beam indication signal correctly (which assumes that the UE receiving the beam indication signal correctly can forward the beam indication signal to the rest of the coordinated UEs within the group); and 2. The ACK/NACK can be reported by each UE of the group of coordinated UEs (the second option is also referred to as option 2-2), which also includes various additional options, as follows: a. The ACK/NACK can be reported via a shared resource, where each given UE may report only when the given UE has decoded the beam indication signal correctly (i.e., ACK only); b. The ACK/NACK can be reported via a shared resource, where each given UE may report only when the given UE has failed to decode the beam indication signal correctly (i.e., NACK only); and c. The ACK/NACK can be reported via a dedicated resource that is configured/indicated by the base station for each UE within the group of coordinated UEs.

Figure 4:
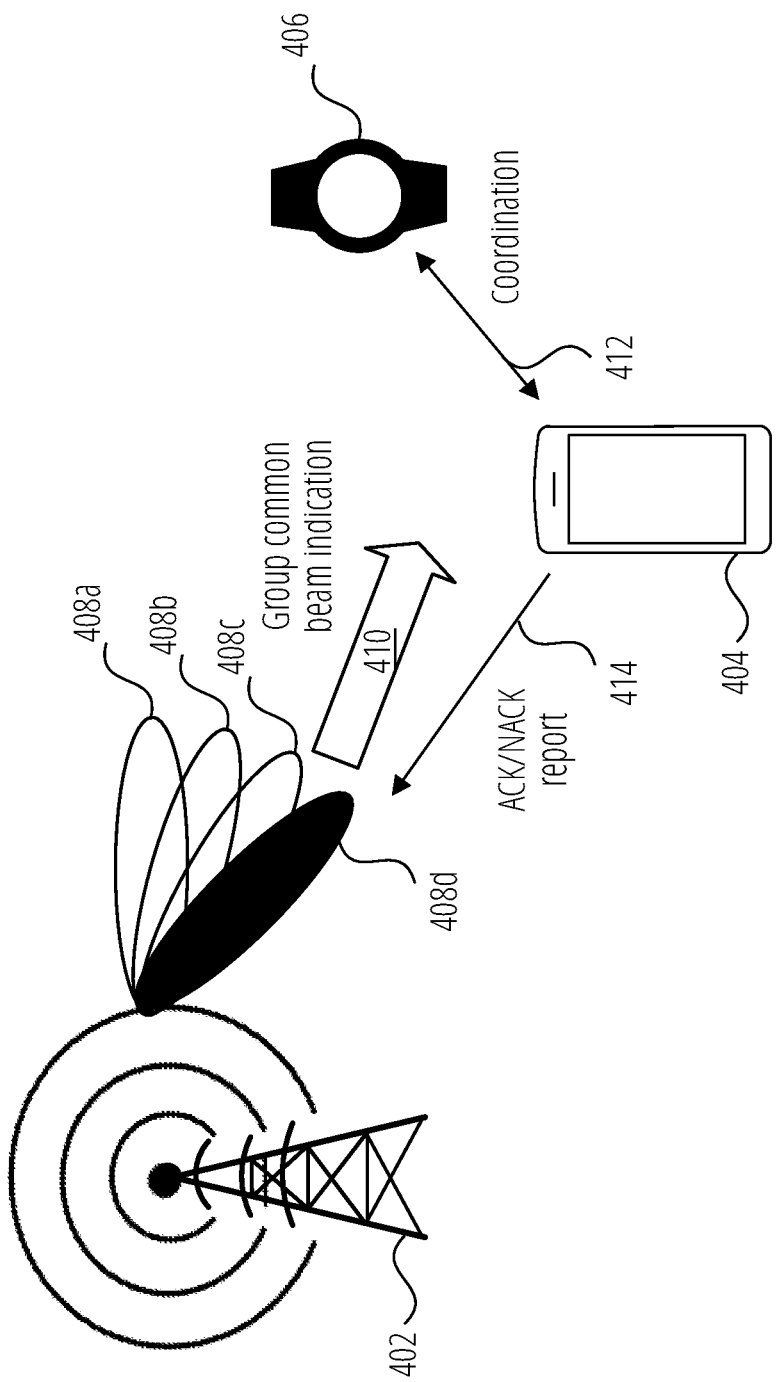
FIG. 4 illustrates a UE coordination environment for beam sharing in accordance with one embodiment.

FIG. 4 illustrates an example of beam indication representing option 2-1 described above. As shown, FIG. 4 includes a base station 402 generating beams 408 (i.e., beam 408a through beam 408d), including the beam 408d, which is solid black to represent that it is the beam that will be shared by multiple UEs. Accordingly, FIG. 4 also includes a UE 404 (e.g., a smartphone) and a UE 406 (e.g., a smartwatch) that are capable of coordinating to share the same network beam (i.e., the beam 408d), as shown by arrow 412. As shown, FIG. 4 also includes arrow 410 representing that beam indication signaling by the base station 402 is provided to both the UE 404 and the UE 406. However, arrow 414 represents that only the UE 404 sends an ACK/NACK message associated with failure or success corresponding to receiving the beam indication signaling (i.e., from the base station 402) at the UE 404 and the UE 406 to the base station 402.

Figure 5:
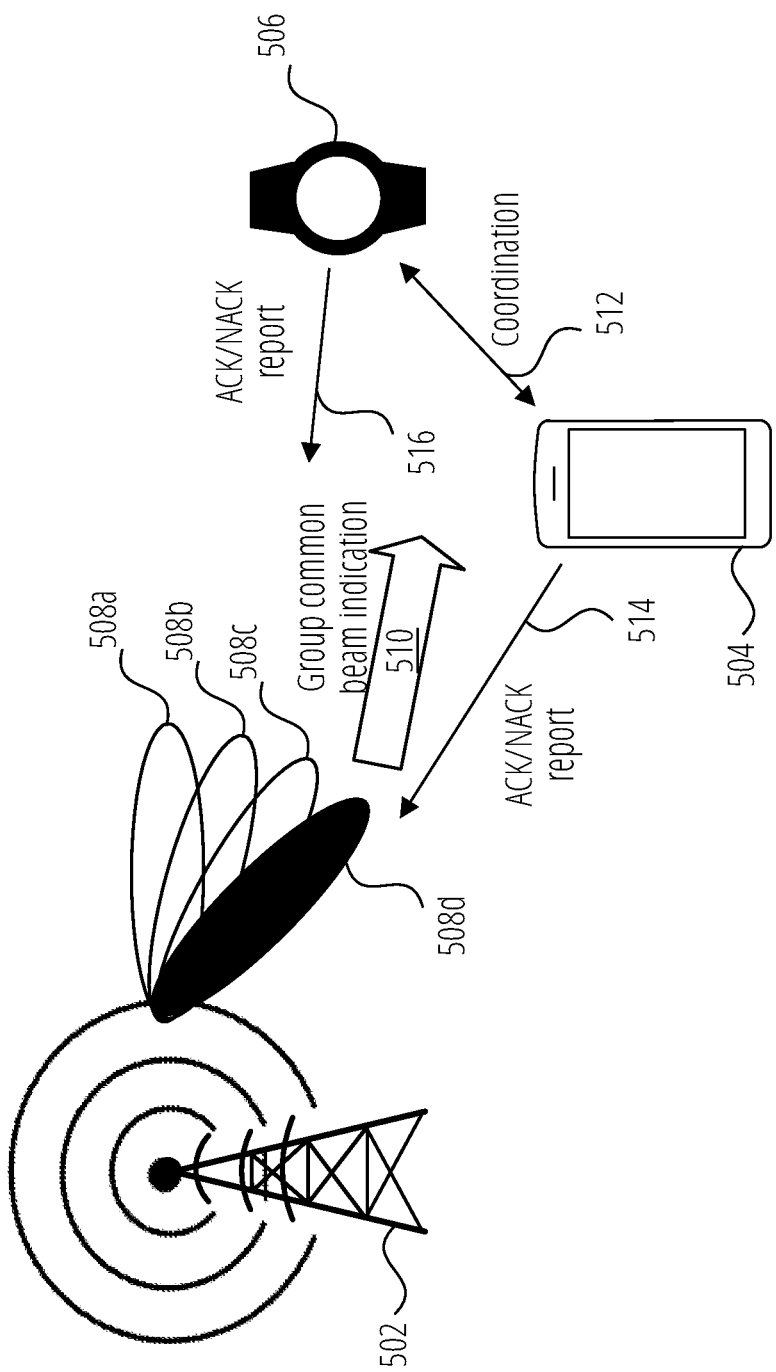
FIG. 5 illustrates a UE coordination environment for beam sharing in accordance with one embodiment.

FIG. 5 illustrates an example of beam indication representing option 2-2 described above. As shown, FIG. 5 includes a base station 502 generating beams 508 (i.e., beam 508a through beam 508d), including the beam 508d, which is solid black to represent that it is the beam that will be shared by multiple UEs. Accordingly, FIG. 5 also includes a UE 504 (e.g., a smartphone) and a UE 506 (e.g., a smartwatch) that are capable of coordinating to share the same network beam (i.e., the beam 508d), as shown by arrow 512. As shown, FIG. 5 also includes arrow 510 representing that beam indication signaling by the base station 502 is provided to both the UE 504 and the UE 506. In addition, arrow 514 and arrow 516 represent that the UE 504 and the UE 506, respectively, send an ACK/NACK message associated with failure or success corresponding to receiving the beam indication signaling to the base station 502.

As briefly discussed above, the principles described herein include solutions related to UE-coordinated beam failure recovery (BFR). Initially, it should be noted that each of the UEs within a group of coordinated UEs do not have to perform the entire BFR (see 3GPP TS 38.213 Section 6) procedure independently. In addition, two options associated with UE-coordinated beam failure recovery may be utilized when practicing the principles described herein.

The first option includes a particular (or first) UE within a group of coordinated UEs sending the BFR request to the base station (e.g., a gNB) when one or more of the UEs within the group of coordinated UEs has not decoded the beam indication signal from the base station correctly and performing the entire BFR procedure. The base station may respond to the request with updated beam information. In such embodiments, after the BFR procedure, all the UEs within the group of coordinated UEs may update their beams/apply the new beam information identified during the BFR procedure of the particular UE. In other words, the entirety of the BFR procedure may be performed with respect to the particular UE. Upon completion of the BFR procedure, the particular UE may then provide updated beam information received from the base station to each of the UEs within the group of coordinated UEs.

The second option includes each of the UEs within a group of coordinated UEs performing the beam failure detection procedure independently. In such embodiments, a particular UE within the group of coordinated UEs can send the beam failure recovery request (BFRQ) using a resource configured by the base station to reduce overhead. Accordingly, the coordinated UEs may communicate with the requesting UE to indicate when a failure to decode the base station's beam indication signal has occurred. During the BFRQ procedure, the particular UE can report a MAC CE to indicate which of the UE(s) within the coordinated group have failed to decode the base station's beam indication signal. The base station may again respond to the request with updated beam information (e.g., a newly identified beam). In particular, the base station may respond to each of the UEs based on the BFRQ (and in particular, to the UEs indicated in the BFQR as having failed to decode the beam indication information provided by the base station). After the BFR procedure, the failed UEs (or all the UEs) can update their beams based on the newly identified beam provided via the base station during the BFR procedure.

Figure 6:
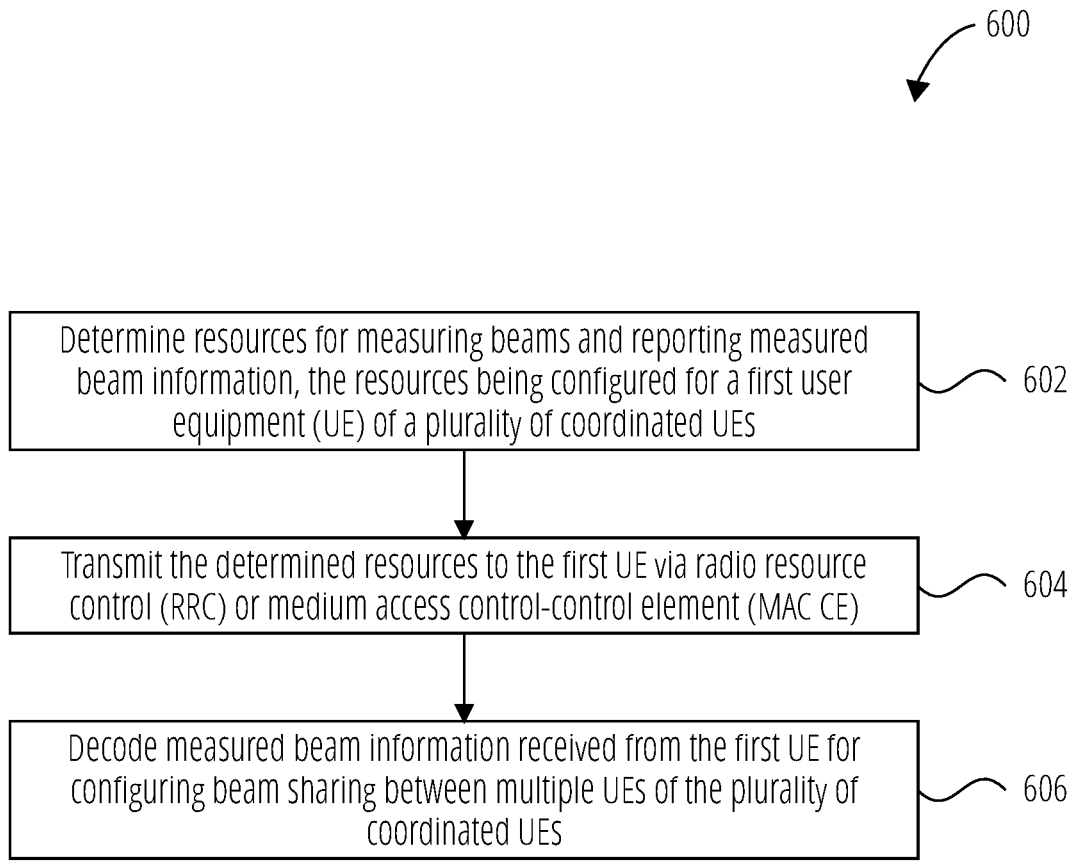
FIG. 6 illustrates a flowchart of a method for UE coordination beam reporting.

FIG. 6 illustrates a flowchart of a method 600 for UE coordination beam reporting. In block 602, the method 600 determines resources for measuring beams and reporting measured beam information. The resources may be configured for a first user equipment (UE) of a plurality of coordinated UEs. In block 604, the method 600 transmits the determined resources to the first UE via radio resource control (RRC) or medium access control-control element (MAC CE). For instance, the base station 302 of FIG. 3 configures (i.e., determines and transmits) information regarding the beam 308d for the UE 304, as represented by arrow 310.

In addition, prior to the base station configuring the resources (i.e., determining and transmitting the resources), the first UE (or any other UE within a group of coordinated UEs) may report to the base station whether the first UE (or any other UE within the group of coordinated UEs) can work in coordinated mode with another UE by higher layer signaling (e.g., RRC or MAC CE). The first UE may also report a UE ID (e.g., C-RNTI) of the other UE(s) that are capable of coordinating with the first UE. In block 606, the method 600 decodes measured beam information received from the first UE for configuring beam sharing between multiple UEs of the plurality of coordinated UEs. For instance, the configured resources may allow the first UE to measure one or more beams and report on such measurements to the base station.

Figure 7:
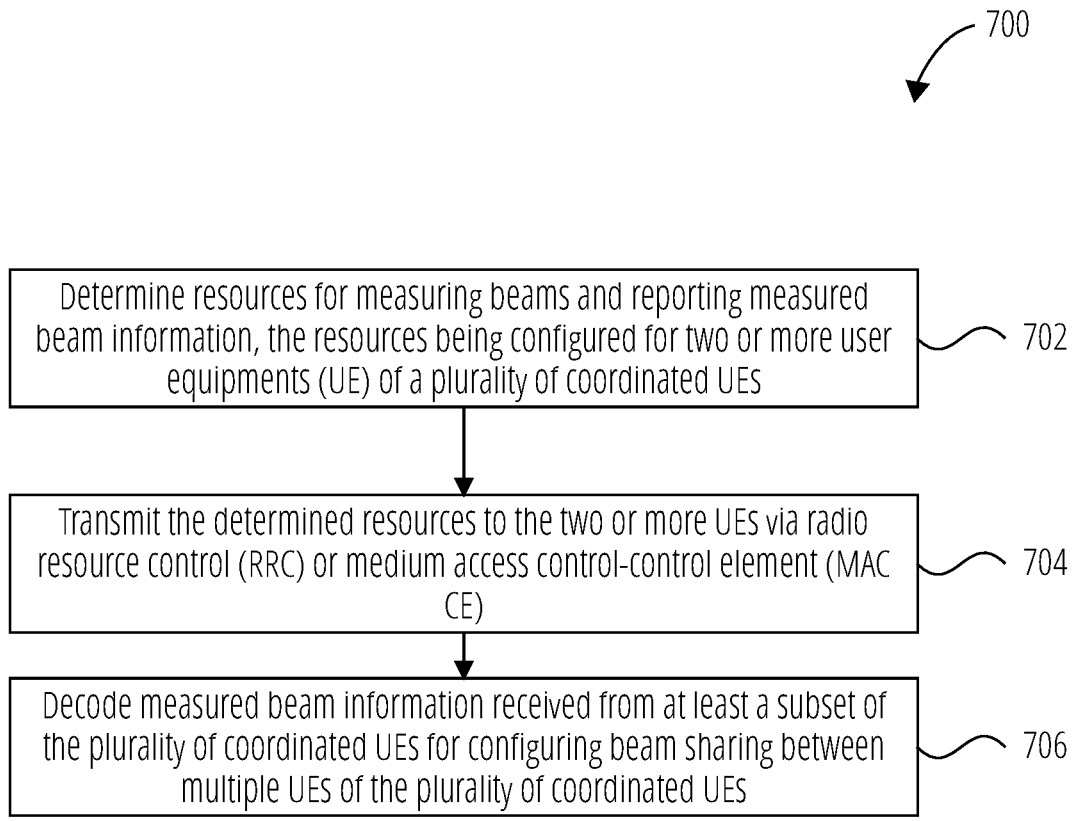
FIG. 7 illustrates a flowchart of a method for UE coordination beam reporting.

FIG. 7 illustrates a flowchart of a method 700 for UE coordination beam reporting. In block 702, the method 700 determines resources for measuring beams and reporting measured beam information. The resources may be configured for two or more user equipments (UE) of a plurality of coordinated UEs. In block 704, the method 700 transmits the determined resources to the two or more UEs via radio resource control (RRC) or medium access control-control element (MAC CE). For instance, the base station 402 of FIG. 4 configures (i.e., determines and transmits) information regarding the beam 408d for the UE 404 and the UE 406, as represented by arrow 410.

In addition, prior to the base station configuring the resources, any given UE (or all UEs) of the group of coordinated UEs may report to the base station whether the given UE (or any other UE within the group of coordinated UEs) can work in coordinated mode with another UE by higher layer signaling (e.g., RRC or MAC CE). The given UE may also report a UE ID (e.g., C-RNTI) of the other UE(s) that are capable of coordinating with the given UE. In block 706, the method 700 decodes measured beam information received from at least a subset of the plurality of coordinated UEs for configuring beam sharing between multiple UEs of the plurality of coordinated UEs. For instance, the configured resources may allow for multiple of the UEs to measure one or more beams and report on such measurements to the base station.

Figure 8:
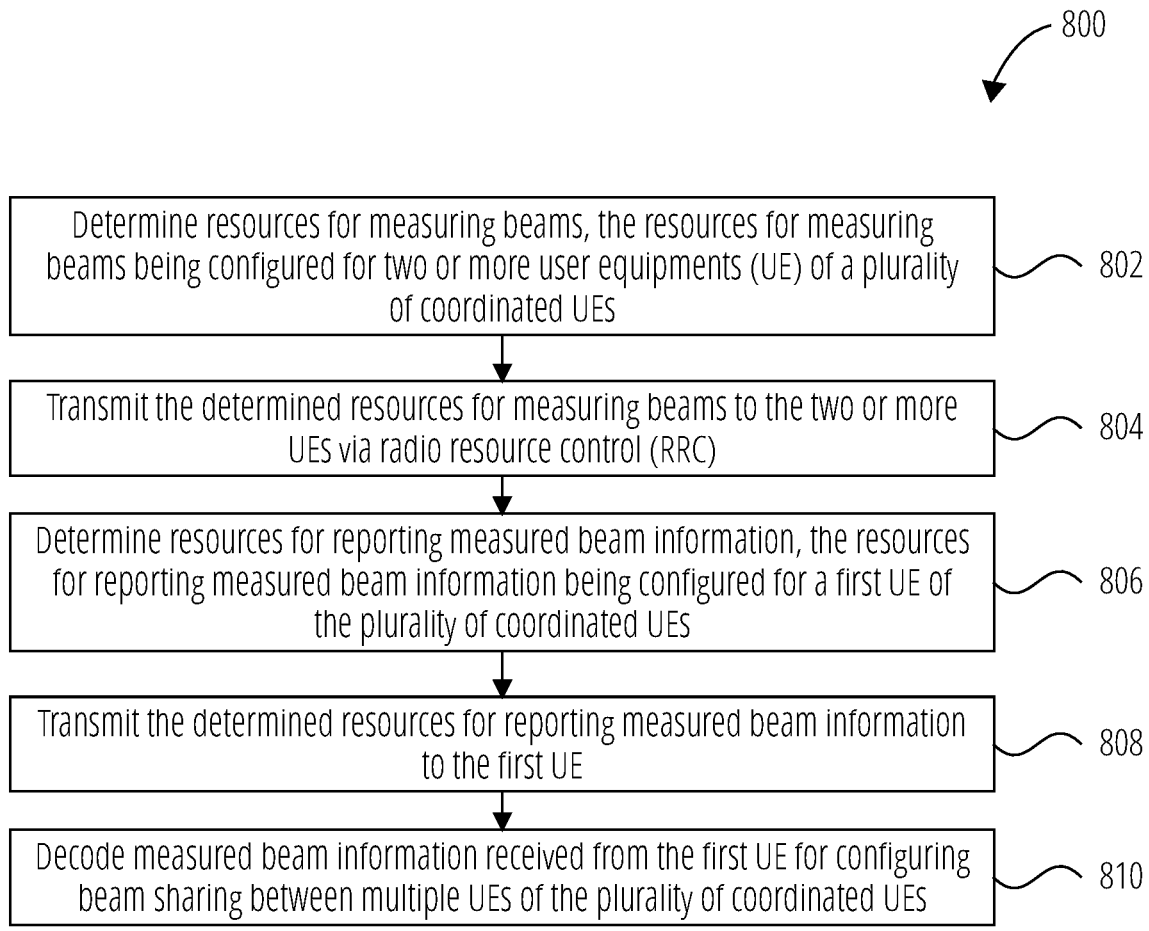
FIG. 8 illustrates a flowchart of a method for UE coordination beam reporting.

FIG. 8 illustrates a flowchart of a method 800 for UE coordination beam reporting. In block 802, the method 800 determines resources for measuring beams. The resources for measuring beams may be configured for two or more user equipments (UE) of a plurality of coordinated UEs. In block 804, the method 800 transmits the determined resources for measuring beams to the two or more UEs via radio resource control (RRC). For instance, the base station 402 of FIG. 4 may configure (i.e., determine and transmit) information regarding measuring beams (e.g., beam 408a through beam 408d) for the UE 404 and the UE 406.

In block 806, the method 800 determines resources for reporting measured beam information. The resources for reporting measured beam information may be configured for a first UE of the plurality of coordinated UEs. In block 808, the method 800 transmits the determined resources for reporting measured beam information to the first UE. For instance, the base station 402 of FIG. 4 may configure (i.e., determine and transmit) information regarding reporting measured beams (e.g., any of beam 408a through beam 408d) for the UE 404. In block 810, the method 800 decodes measured beam information received from the first UE for configuring beam sharing between multiple UEs of the plurality of coordinated UEs. For instance, the configured resources may allow each of the plurality of UEs (or less than each coordinated UEUE) to measure one or more beams and the first UE to report on such measurements to the base station.

Figure 9:
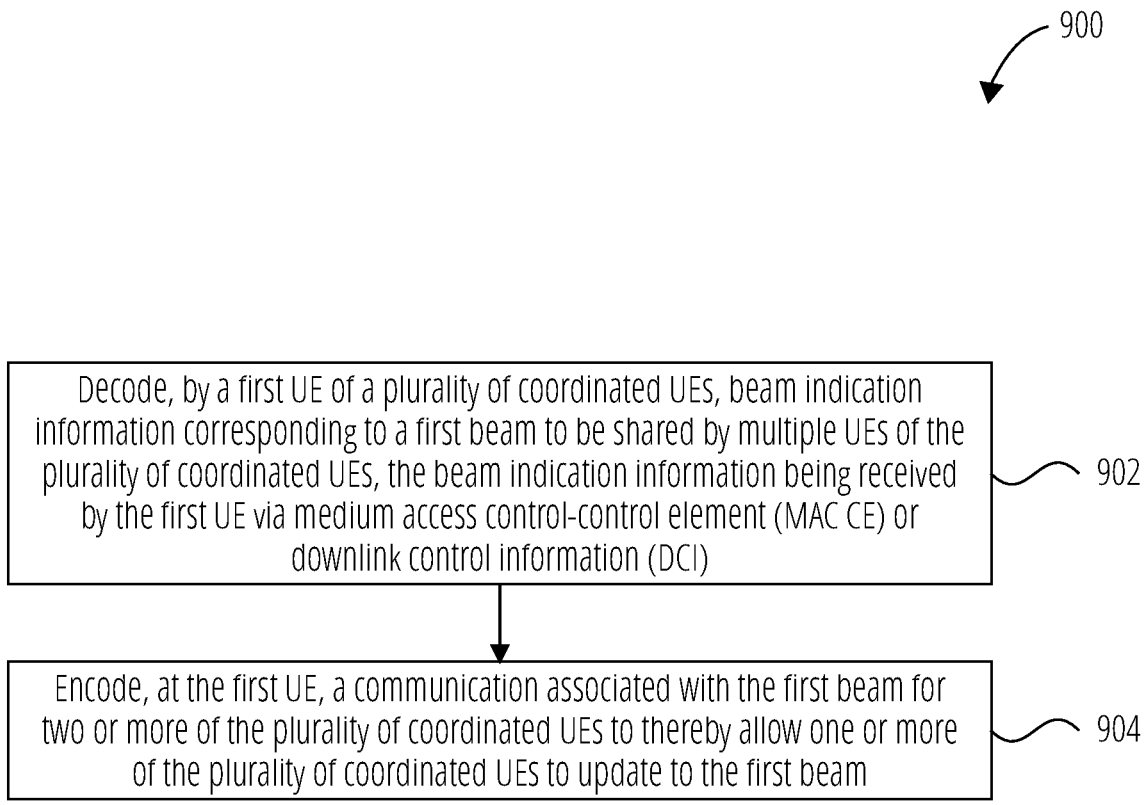
FIG. 9 illustrates a flowchart of a method for beam indication associated with coordinated UEs.

FIG. 9 illustrates a flowchart of a method 900 for beam indication associated with coordinated UEs. In block 902, the method 900 decodes, by a first user equipment (UE) of a plurality of coordinated UEs, beam indication information corresponding to a first beam to be shared by multiple UEs of the plurality of coordinated UEs. For instance, the beam indication information may be received by the first UE via medium access control-control element (MAC CE) or downlink control information (DCI).

In block 904, the method 900 encodes, at the first UE, a communication associated with the first beam for two or more of the plurality of coordinated UEs to thereby allow one or more of the plurality of coordinated UEs to update to the first beam. For instance, the first UE may send the beam indication information associated with a first beam to each of the plurality of coordinated UEs (or less than each coordinated UE).

Figure 10:
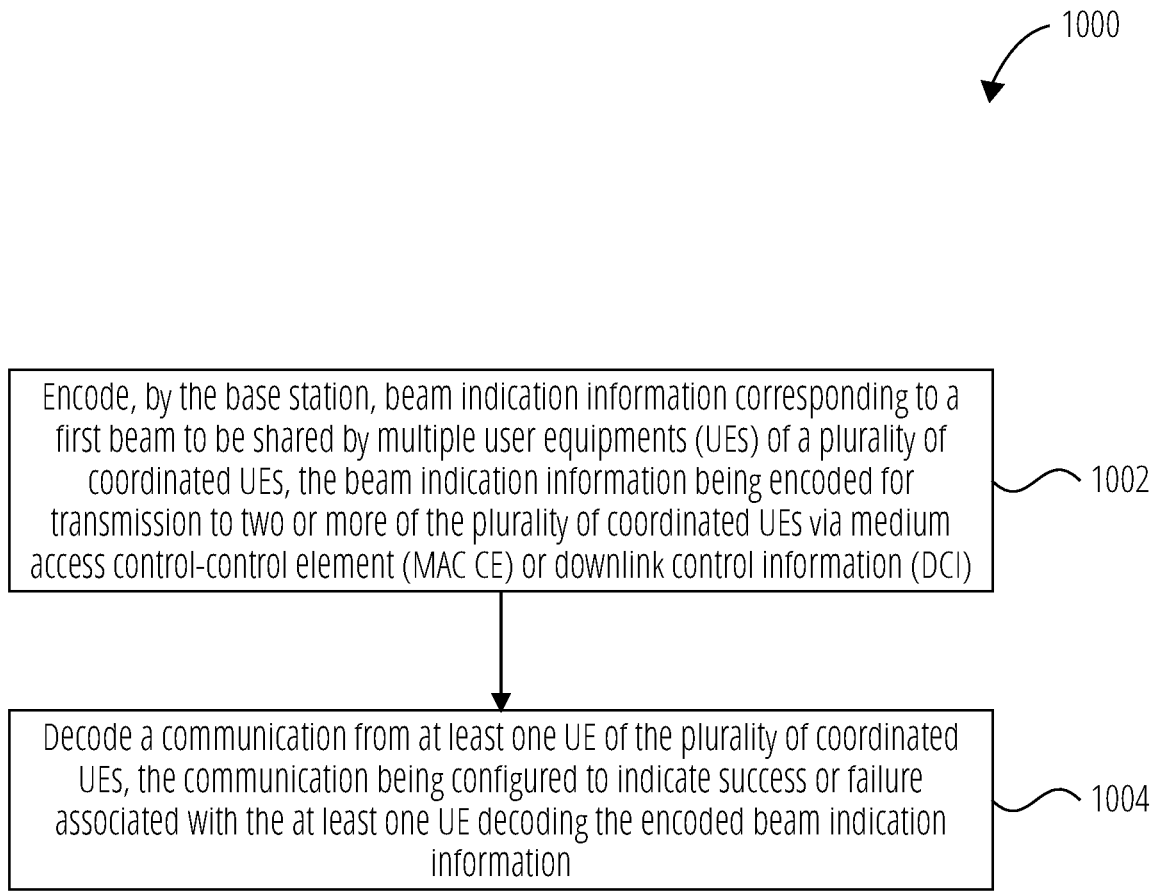
FIG. 10 illustrates a flowchart of a method for beam indication associated with coordinated UEs.

FIG. 10 illustrates a flowchart of a method 1000 for beam indication associated with coordinated UEs. In block 1002, the method 1000 encodes, by a base station, beam indication information corresponding to a first beam to be shared by multiple user equipments (UEs) of a plurality of coordinated UEs. The beam indication information may be encoded for transmission to two or more of the plurality of coordinated UEs via medium access control-control element (MAC CE) or downlink control information (DCI).

In block 1004, the method 1000 decodes a communication from at least one UE of the plurality of coordinated UEs. For instance, the communication may be configured to indicate success or failure associated with the at least one UE decoding the encoded beam indication information. Furthermore, at least one UE (and as many as all of the coordinated UEs) may send an ACK or NACK communication to the base station associated with success or failure of decoding the beam indication information.

Figure 11:
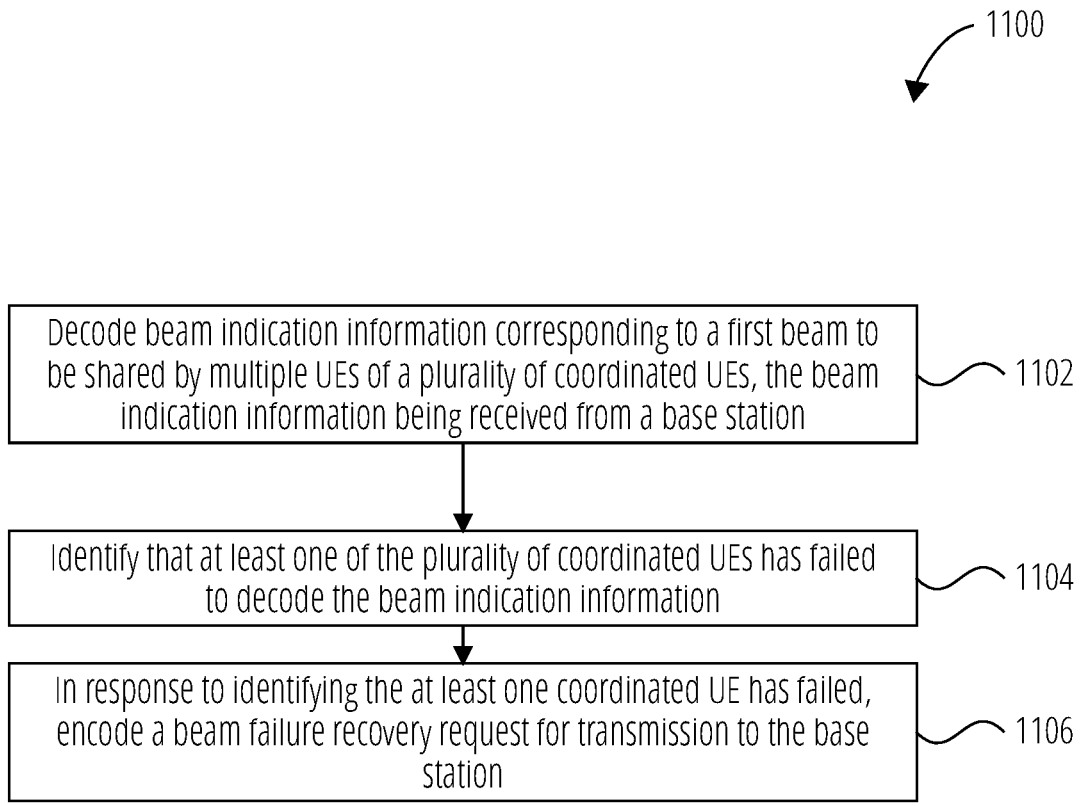
FIG. 11 illustrates a flowchart of a method for UE coordinated beam failure recovery.

FIG. 11 illustrates a flowchart of a method 1100 for UE coordinated beam failure recovery. In block 1102, the method 1100 decodes beam indication information corresponding to a first beam to be shared by multiple UEs of a plurality of coordinated UEs. The beam indication information may be received from a base station. For example, a first UE of a group of coordinated UEs or each UE of a group of coordinated UEs (or any number of the coordinated UEs may receive a beam indication from a base station. In block 1104, the method 1100 identifies that at least one of the plurality of coordinated UEs has failed to decode the beam indication information. For instance, the first UE in the previous example may determine that one or more of the UEs in the group of coordinated UEs has failed to decode the beam indication information (e.g., through receiving such information directly from the other coordinated UEs). In block 1106, the method 1100, in response to identifying the at least one coordinated UE has failed, encodes a beam failure recovery request for transmission to the base station. For instance, the first UE may send the beam failure recovery request regarding each of the UEs that failed to decode the beam indication information.

Figure 12:
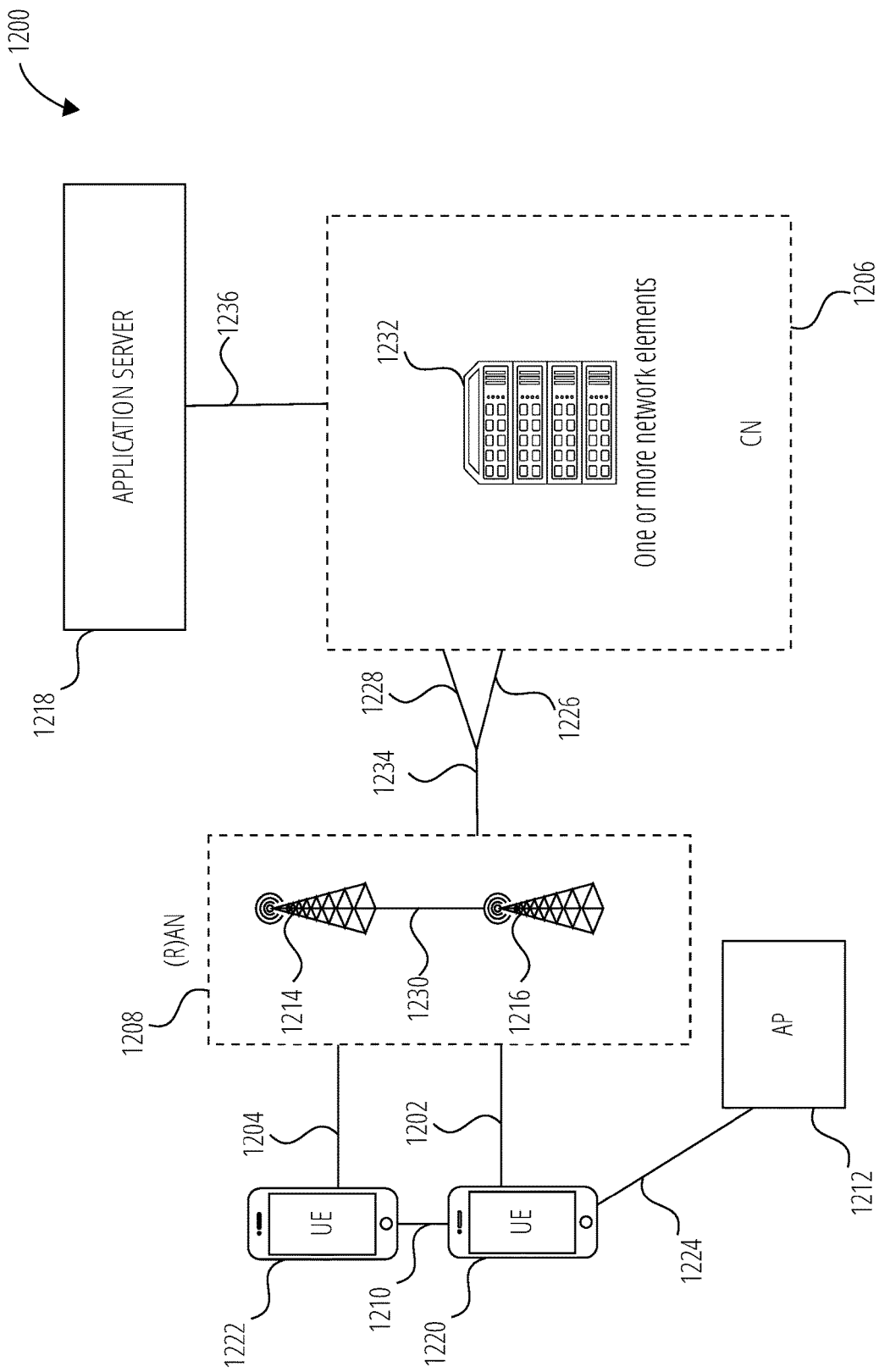
FIG. 12 illustrates a system in accordance with one embodiment.

FIG. 12 illustrates an example architecture of a system 1200 of a network, in accordance with various embodiments. The following description is provided for an example system 1200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 12, the system 1200 includes UE 1222 and UE 1220. In this example, the UE 1222 and the UE 1220 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1222 and/or the UE 1220 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1222 and UE 1220 may be configured to connect, for example, communicatively couple, with an access node or radio access node (shown as (R)AN 1208). In embodiments, the (R)AN 1208 may be an NG RAN or a 5G RAN, an E-UTRAN, or a legacy RAN, such as a UTRAN or GERAN. As used herein, the term "NG RAN" or the like may refer to a (R)AN 1208 that operates in an NR or 5G system, and the term "E-UTRAN" or the like may refer to a (R)AN 1208 that operates in an LTE or 4G system. The UE 1222 and UE 1220 utilize connections (or channels) (shown as connection 1204 and connection 1202, respectively), each of which comprises a physical communications interface or layer (discussed in further detail below).

In this example, the connection 1204 and connection 1202 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 1222 and UE 1220 may directly exchange communication data via a ProSe interface 1210. The ProSe interface 1210 may alternatively be referred to as a sidelink (SL) interface and may comprise one or more logical channels, including but not limited to a PSCCH, a PSSCH, a PSDCH, and a PSBCH.

The UE 1220 is shown to be configured to access an AP 1212 (also referred to as "WLAN node," "WLAN," "WLAN Termination," "WT" or the like) via connection 1224. The connection 1224 can comprise a local wireless connection, such as a connection consistent with any IEEE 802.11 protocol, wherein the AP 1212 would comprise a wireless fidelity (Wi-Fi®) router. In this example, the AP 1212 may be connected to the Internet without connecting to the core network of the wireless system (described in further detail below). In various embodiments, the UE 1220, (R)AN 1208, and AP 1212 may be configured to utilize LWA operation and/or LWIP operation. The LWA operation may involve the UE 1220 in RRC_CONNECTED being configured by the RAN node 1214 or the RAN node 1216 to utilize radio resources of LTE and WLAN. LWIP operation may involve the UE 1220 using WLAN radio resources (e.g., connection 1224) via IPsec protocol tunneling to authenticate and encrypt packets (e.g., IP packets) sent over the connection 1224. IPsec tunneling may include encapsulating the entirety of original IP packets and adding a new packet header, thereby protecting the original header of the IP packets.

The (R)AN 1208 can include one or more AN nodes, such as RAN node 1214 and RAN node 1216, that enable the connection 1204 and connection 1202. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 1200 (e.g., an eNB). According to various embodiments, the RAN node 1214 or RAN node 1216 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1214 or RAN node 1216 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1214 or RAN node 1216); a MAC/PHY split wherein RRC, PDCP, RLC, and MAC layers are operated by the CRAN/vBBUP and the PHY layer is operated by individual RAN nodes (e.g., RAN node 1214 or RAN node 1216); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1214 or RAN node 1216 to perform other virtualized applications. In some implementations, an individual RAN node may represent individual gNB-DUs that are connected to a gNB-CU via individual F1 interfaces (not shown by FIG. 12). In these implementations, the gNB-DUs may include one or more remote radio heads or RFEMs, and the gNB-CU may be operated by a server that is located in the (R)AN 1208 (not shown) or by a server pool in a similar manner as the CRAN/vBBUP. Additionally, or alternatively, one or more of the RAN node 1214 or RAN node 1216 may be next generation eNBs (ng-eNBs), which are RAN nodes that provide E-UTRA user plane and control plane protocol terminations toward the UE 1222 and UE 1220, and are connected to an SGC via an NG interface (discussed infra). In V2X scenarios one or more of the RAN node 1214 or RAN node 1216 may be or act as RSUs.

To operate in the unlicensed spectrum, the UE 1222 and UE 1220 and the RAN node 1214 or RAN node 1216 may operate using LAA, eLAA, and/or feLAA mechanisms. In these implementations, the UE 1222 and UE 1220 and the RAN node 1214 or RAN node 1216 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1222 and UE 1220, RAN node 1214 or RAN node 1216, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1222, AP 1212, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1222 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1222 and UE 1220. The PDCCH carries information about the transport format and resource allocations related to the PDSCH channel, among other things. It may also inform the UE 1222 and UE 1220 about the transport format, resource allocation, and HARQ information related to the uplink shared channel. Typically, downlink scheduling (assigning control and shared channel resource blocks to the UE 1220 within a cell) may be performed at any of the RAN node 1214 or RAN node 1216 based on channel quality information fed back from any of the UE 1222 and UE 1220. The downlink resource assignment information may be sent on the PDCCH used for (e.g., assigned to) each of the UE 1222 and UE 1220.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN node 1214 or RAN node 1216 may be configured to communicate with one another via interface 1230. In embodiments where the system 1200 is an LTE system (e.g., when CN 1206 is an EPC), the interface 1230 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1222 from an SeNB for user data; information of PDCP PDUs that were not delivered to a UE 1222; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1200 is a 5G or NR system (e.g., when CN 1206 is an 5GC), the interface 1230 may be an Xn interface. The Xn interface is defined between two or more RAN nodes (e.g., two or more gNBs and the like) that connect to 5GC, between a RAN node 1214 (e.g., a gNB) connecting to 5GC and an eNB, and/or between two eNBs connecting to 5GC (e.g., CN 1206). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1222 in a connected mode (e.g., CM-CONNECTED) including functionality to manage the UE mobility for connected mode between one or more RAN node 1214 or RAN node 1216. The mobility support may include context transfer from an old (source) serving RAN node 1214 to new (target) serving RAN node 1216; and control of user plane tunnels between old (source) serving RAN node 1214 to new (target) serving RAN node 1216. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1208 is shown to be communicatively coupled to a core network—in this embodiment, CN 1206. The CN 1206 may comprise one or more network elements 1232, which are configured to offer various data and telecommunications services to customers/subscribers (e.g., users of UE 1222 and UE 1220) who are connected to the CN 1206 via the (R)AN 1208. The components of the CN 1206 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1206 may be referred to as a network slice, and a logical instantiation of a portion of the CN 1206 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1218 may be an element offering applications that use IP bearer resources with the core network (e.g., UMTS PS domain, LTE PS data services, etc.). The application server 1218 can also be configured to support one or more communication services (e.g., VoIP sessions, PTT sessions, group communication sessions, social networking services, etc.) for the UE 1222 and UE 1220 via the EPC. The application server 1218 may communicate with the CN 1206 through an IP communications interface 1236.

In embodiments, the CN 1206 may be an SGC, and the (R)AN 116 may be connected with the CN 1206 via an NG interface 1234. In embodiments, the NG interface 1234 may be split into two parts, an NG user plane (NG-U) interface 1226, which carries traffic data between the RAN node 1214 or RAN node 1216 and a UPF, and the S1 control plane (NG-C) interface 1228, which is a signaling interface between the RAN node 1214 or RAN node 1216 and AMFs.

In embodiments, the CN 1206 may be a SG CN, while in other embodiments, the CN 1206 may be an EPC). Where CN 1206 is an EPC, the (R)AN 116 may be connected with the CN 1206 via an S1 interface 1234. In embodiments, the S1 interface 1234 may be split into two parts, an S1 user plane (S1-U) interface 1226, which carries traffic data between the RAN node 1214 or RAN node 1216 and the S-GW, and the S1-MME interface 1228, which is a signaling interface between the RAN node 1214 or RAN node 1216 and MMEs.

Figure 13:
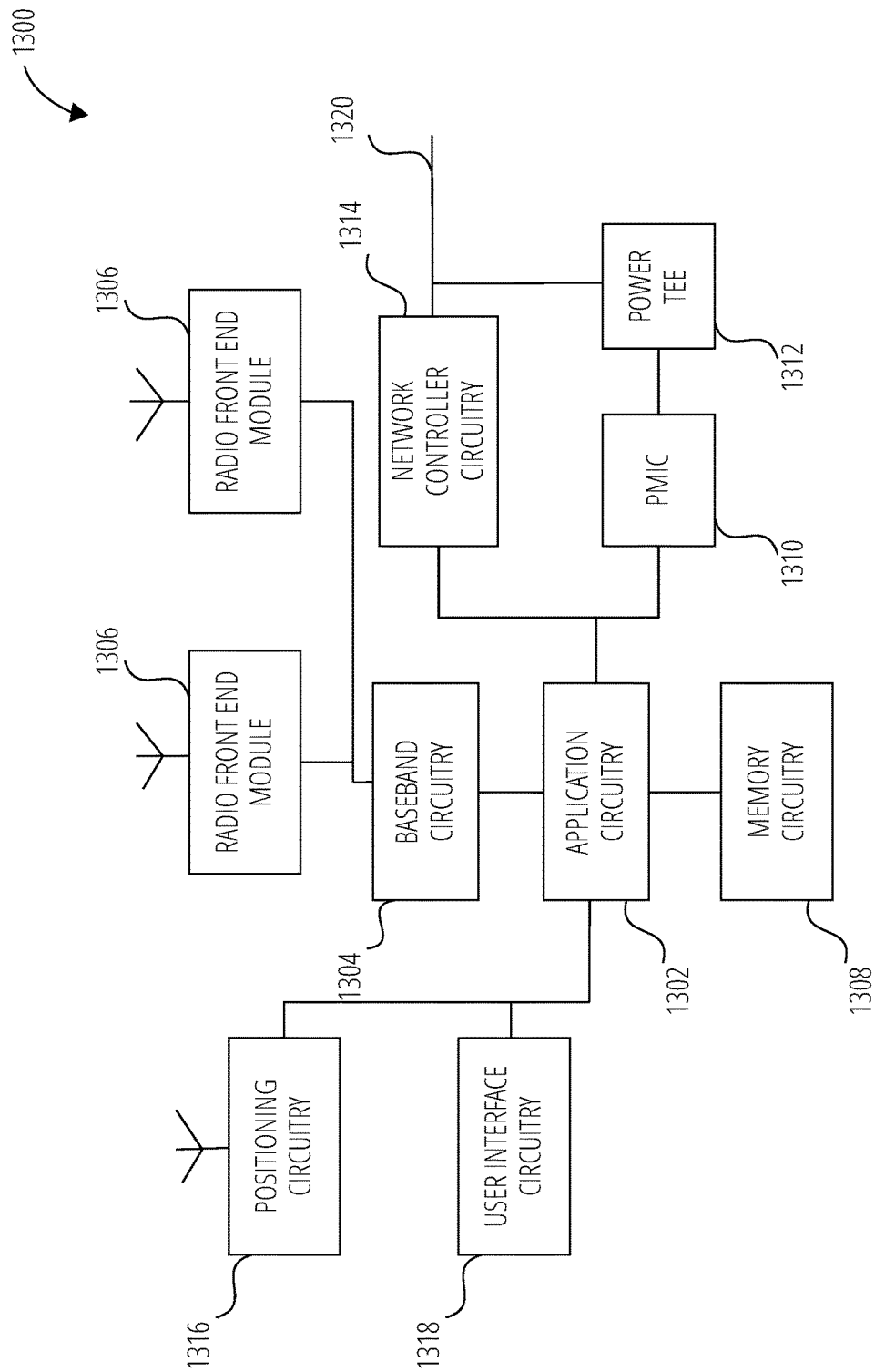
FIG. 13 illustrates an infrastructure equipment in accordance with one embodiment.

FIG. 13 illustrates an example of infrastructure equipment 1300 in accordance with various embodiments. The infrastructure equipment 1300 may be implemented as a base station, radio head, RAN node, AN, application server, and/or any other element/device discussed herein. In other examples, the infrastructure equipment 1300 could be implemented in or by a UE.

The infrastructure equipment 1300 includes application circuitry 1302, baseband circuitry 1304, one or more radio front end module 1306 (RFEM), memory circuitry 1308, power management integrated circuitry (shown as PMIC 1310), power tee circuitry 1312, network controller circuitry 1314, network interface connector 1320, satellite positioning circuitry 1316, and user interface circuitry 1318. In some embodiments, the device infrastructure equipment 1300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1302 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1302 may be coupled with or may include memory/storage elements and may be configured to execute instructions stored in the memory/storage to enable various applications or operating systems to run on the infrastructure equipment 1300. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 1302 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1302 may comprise, or may be, a special-purpose processor/controller to operate according to the various embodiments herein. As examples, the processor(s) of application circuitry 1302 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1300 may not utilize application circuitry 1302, and instead may include a special-purpose processor/controller to process IP data received from an EPC or 5GC, for example.

In some implementations, the application circuitry 1302 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1302 may comprise logic blocks or logic fabric, and other interconnected resources that may be programmed to perform various functions, such as the procedures, methods, functions, etc. of the various embodiments discussed herein. In such embodiments, the circuitry of application circuitry 1302 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1304 may be implemented, for example, as a solder-down substrate including one or more integrated circuits, a single packaged integrated circuit soldered to a main circuit board or a multi-chip module containing two or more integrated circuits.

The user interface circuitry 1318 may include one or more user interfaces designed to enable user interaction with the infrastructure equipment 1300 or peripheral component interfaces designed to enable peripheral component interaction with the infrastructure equipment 1300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1306 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1306, which incorporates both mmWave antennas and sub-mmWave.

The memory circuitry 1308 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1308 may be implemented as one or more of solder down packaged integrated circuits, socketed memory modules and plug-in memory cards.

The PMIC 1310 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1312 may provide for electrical power drawn from a network cable to provide both power supply and data connectivity to the infrastructure equipment 1300 using a single cable.

The network controller circuitry 1314 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1300 via network interface connector 1320 using a physical connection, which may be electrical (commonly referred to as a "copper interconnect"), optical, or wireless. The network controller circuitry 1314 may include one or more dedicated processors and/or FPGAs to communicate using one or more of the aforementioned protocols. In some implementations, the network controller circuitry 1314 may include multiple controllers to provide connectivity to other networks using the same or different protocols.

Figure 14:
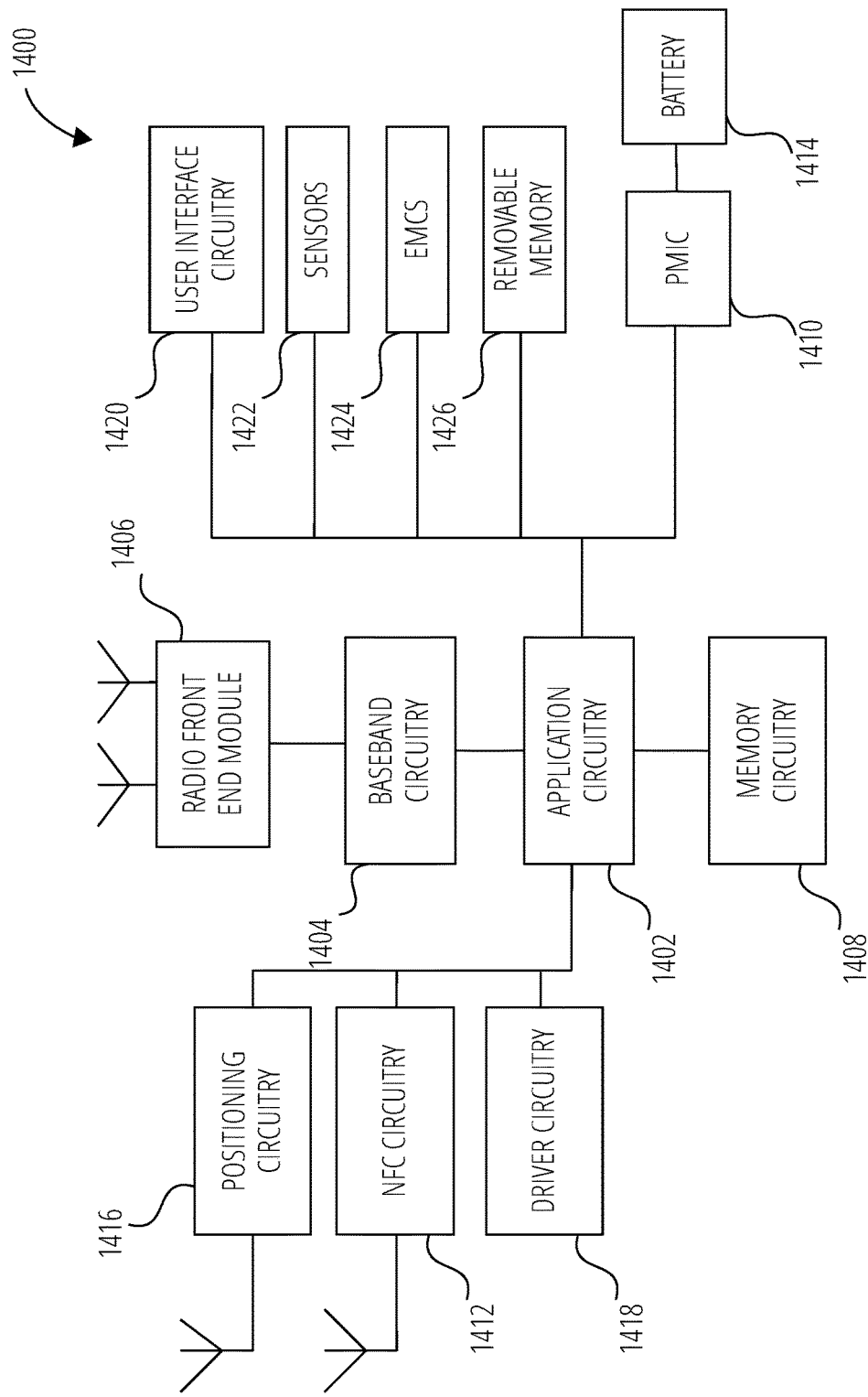
FIG. 14 illustrates a platform in accordance with one embodiment.

FIG. 14 illustrates an example of a platform 1400 in accordance with various embodiments. In embodiments, the computer platform 1400 may be suitable for use as UEs, application servers, and/or any other element/device discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The block diagram of FIG. 14 is intended to show a high level view of components of the computer platform 1400. However, some of the components shown may be omitted, additional components may be present, and different arrangement of the components shown may occur in other implementations.

Application circuitry 1402 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1402 may be coupled with or may include memory/storage elements and may be configured to execute instructions stored in the memory/storage to enable various applications or operating systems to run on the platform 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1402 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1402 may comprise, or may be, a special-purpose processor/controller to operate according to the various embodiments herein.

As examples, the processor(s) of application circuitry 1402 may include an Intel® Architecture Core™ based processor, such as a Quark™, an Atom™, an i3, an i5, an i7, or an MCU-class processor, or another such processor available from Intel® Corporation. The processors of the application circuitry 1402 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1402 may be a part of a system on a chip (SoC) in which the application circuitry 1402 and other components are formed into a single integrated circuit, or a single package, such as the Edison™ or Galileo™ SoC boards from Intel® Corporation.

Additionally or alternatively, application circuitry 1402 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1402 may comprise logic blocks or logic fabric, and other interconnected resources that may be programmed to perform various functions, such as the procedures, methods, functions, etc. of the various embodiments discussed herein. In such embodiments, the circuitry of application circuitry 1402 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1404 may be implemented, for example, as a solder-down substrate including one or more integrated circuits, a single packaged integrated circuit soldered to a main circuit board or a multi-chip module containing two or more integrated circuits.

The radio front end module 1406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1406, which incorporates both mmWave antennas and sub-mmWave.

The memory circuitry 1408 may include any number and type of memory devices used to provide for a given amount of system memory. As examples, the memory circuitry 1408 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1408 may be developed in accordance with a Joint Electron Devices Engineering Council (JEDEC) low power double data rate (LPDDR)-based design, such as LPDDR2, LPDDR3, LPDDR4, or the like. Memory circuitry 1408 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1408 maybe on-die memory or registers associated with the application circuitry 1402. To provide for persistent storage of information such as data, applications, operating systems and so forth, memory circuitry 1408 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1400 may incorporate the three-dimensional (3D) cross-point (XPOINT) memories from Intel® and Micron®.

The removable memory 1426 may include devices, circuitry, enclosures/housings, ports or receptacles, etc. used to couple portable data storage devices with the platform 1400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1400 may also include interface circuitry (not shown) that is used to connect external devices with the platform 1400. The external devices connected to the platform 1400 via the interface circuitry include sensors 1422 and electro-mechanical components (shown as EMCs 1424), as well as removable memory devices coupled to removable memory 1426.

The sensors 1422 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

In some implementations, the interface circuitry may connect the platform 1400 with Near-Field Communication circuitry (shown as NFC circuitry 1412). The NFC circuitry 1412 is configured to provide contactless, short-range communications based on radio frequency identification (RFID) standards, wherein magnetic field induction is used to enable communication between NFC circuitry 1412 and NFC-enabled devices external to the platform 1400 (e.g., an "NFC touchpoint"). NFC circuitry 1412 comprises an NFC controller coupled with an antenna element and a processor coupled with the NFC controller. The NFC controller may be a chip/IC providing NFC functionalities to the NFC circuitry 1412 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1412, or initiate data transfer between the NFC circuitry 1412 and another active NFC device (e.g., a smartphone or an NFC-enabled POS terminal) that is proximate to the platform 1400.

The driver circuitry 1418 may include software and hardware elements that operate to control particular devices that are embedded in the platform 1400, attached to the platform 1400, or otherwise communicatively coupled with the platform 1400. The driver circuitry 1418 may include individual drivers allowing other components of the platform 1400 to interact with or control various input/output (I/O) devices that may be present within, or connected to, the platform 1400. For example, driver circuitry 1418 may include a display driver to control and allow access to a display device, a touchscreen driver to control and allow access to a touchscreen interface of the platform 1400, sensor drivers to obtain sensor readings of sensors 1422 and control and allow access to sensors 1422, EMC drivers to obtain actuator positions of the EMCs 1424 and/or control and allow access to the EMCs 1424, a camera driver to control and allow access to an embedded image capture device, audio drivers to control and allow access to one or more audio devices.

The power management integrated circuitry (shown as PMIC 1410) (also referred to as "power management circuitry") may manage power provided to various components of the platform 1400. In particular, with respect to the baseband circuitry 1404, the PMIC 1410 may control power-source selection, voltage scaling, battery charging, or DC-to-DC conversion. The PMIC 1410 may often be included when the platform 1400 is capable of being powered by a battery 1414, for example, when the device is included in a UE.

In some embodiments, the PMIC 1410 may control, or otherwise be part of, various power saving mechanisms of the platform 1400. For example, if the platform 1400 is in an RRC_Connected state, where it is still connected to the RAN node as it expects to receive traffic shortly, then it may enter a state known as Discontinuous Reception Mode (DRX) after a period of inactivity. During this state, the platform 1400 may power down for brief intervals of time and thus save power. If there is no data traffic activity for an extended period of time, then the platform 1400 may transition off to an RRC_Idle state, where it disconnects from the network and does not perform operations such as channel quality feedback, handover, etc. The platform 1400 goes into a very low power state and it performs paging where again it periodically wakes up to listen to the network and then powers down again. The platform 1400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1414 may power the platform 1400, although in some examples the platform 1400 may be mounted deployed in a fixed location, and may have a power supply coupled to an electrical grid. The battery 1414 may be a lithium ion battery, a metal-air battery, such as a zinc-air battery, an aluminum-air battery, a lithium-air battery, and the like. In some implementations, such as in V2X applications, the battery 1414 may be a typical lead-acid automotive battery.

In some implementations, the battery 1414 may be a "smart battery," which includes or is coupled with a Battery Management System (BMS) or battery monitoring integrated circuitry. The BMS may be included in the platform 1400 to track the state of charge (SoCh) of the battery 1414. The BMS may be used to monitor other parameters of the battery 1414 to provide failure predictions, such as the state of health (SoH) and the state of function (SoF) of the battery 1414. The BMS may communicate the information of the battery 1414 to the application circuitry 1402 or other components of the platform 1400. The BMS may also include an analog-to-digital (ADC) convertor that allows the application circuitry 1402 to directly monitor the voltage of the battery 1414 or the current flow from the battery 1414. The battery parameters may be used to determine actions that the platform 1400 may perform, such as transmission frequency, network operation, sensing frequency, and the like.

A power block, or other power supply coupled to an electrical grid may be coupled with the BMS to charge the battery 1414. In some examples, the power block may be replaced with a wireless power receiver to obtain the power wirelessly, for example, through a loop antenna in the computer platform 1400. In these examples, a wireless battery charging circuit may be included in the BMS. The specific charging circuits chosen may depend on the size of the battery 1414, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1420 includes various input/output (I/O) devices present within, or connected to, the platform 1400, and includes one or more user interfaces designed to enable user interaction with the platform 1400 and/or peripheral component interfaces designed to enable peripheral component interaction with the platform 1400. The user interface circuitry 1420 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1400. The output device circuitry may also include speakers or other audio emitting devices, printer(s), and/or the like. In some embodiments, the sensors 1422 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1400 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 15:
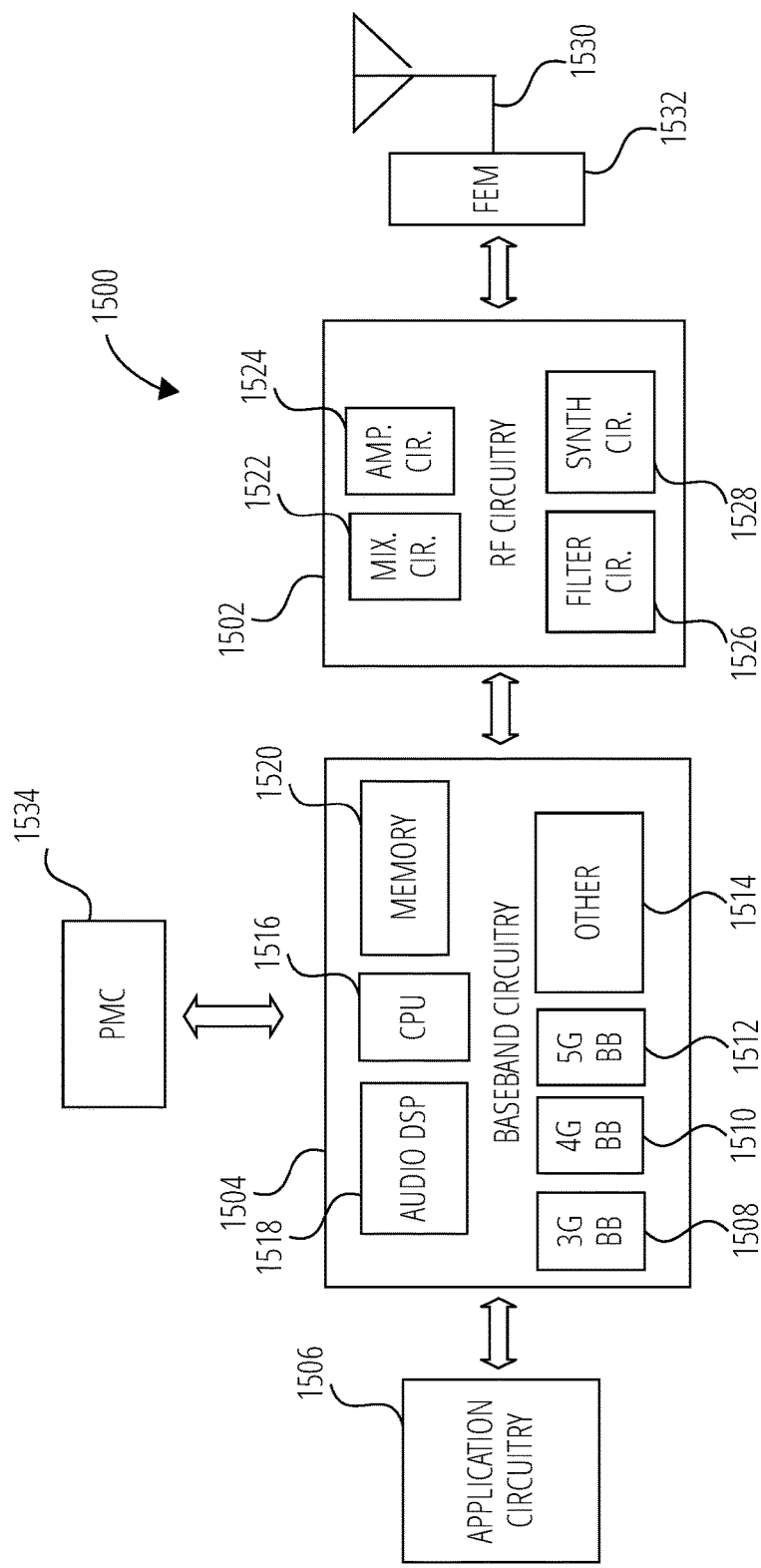
FIG. 15 illustrates a device in accordance with one embodiment.

FIG. 15 illustrates example components of a device 1500 in accordance with some embodiments. In some embodiments, the device 1500 may include application circuitry 1506, baseband circuitry 1504, Radio Frequency (RF) circuitry (shown as RF circuitry 1502), front-end module (FEM) circuitry (shown as FEM circuitry 1532), one or more antennas 1530, and power management circuitry (PMC) (shown as PMC 1534) coupled together at least as shown. The components of the illustrated device 1500 may be included in a UE or a RAN node. In some embodiments, the device 1500 may include fewer elements (e.g., a RAN node may not utilize application circuitry 1506, and instead include a processor/controller to process IP data received from an EPC). In some embodiments, the device 1500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1506 may include one or more application processors. For example, the application circuitry 1506 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1500. In some embodiments, processors of application circuitry 1506 may process IP data packets received from an EPC.

The baseband circuitry 1504 may include circuitry such as, but not limited to, one or more single-core or multi-core processors. The baseband circuitry 1504 may include one or more baseband processors or control logic to process baseband signals received from a receive signal path of the RF circuitry 1502 and to generate baseband signals for a transmit signal path of the RF circuitry 1502. The baseband circuitry 1504 may interface with the application circuitry 1506 for generation and processing of the baseband signals and for controlling operations of the RF circuitry 1502. For example, in some embodiments, the baseband circuitry 1504 may include a third generation (3G) baseband processor (3G baseband processor 1508), a fourth generation (4G) baseband processor (4G baseband processor 1510), a fifth generation (5G) baseband processor (5G baseband processor 1512), or other baseband processor(s) 1514 for other existing generations, generations in development or to be developed in the future (e.g., second generation (2G), sixth generation (6G), etc.). The baseband circuitry 1504 (e.g., one or more of baseband processors) may handle various radio control functions that enable communication with one or more radio networks via the RF circuitry 1502. In other embodiments, some or all of the functionality of the illustrated baseband processors may be included in modules stored in the memory 1520 and executed via a Central Processing Unit (CPU 1516). The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, or constellation mapping/demapping functionality. In some embodiments, encoding/decoding circuitry of the baseband circuitry 1504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include a digital signal processor (DSP), such as one or more audio DSP(s) 1518. The one or more audio DSP(s) 1518 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1506 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1504 is configured to support radio communications of more than one wireless protocol may be referred to as multi-mode baseband circuitry.

The RF circuitry 1502 may enable communication with wireless networks using modulated electromagnetic radiation through a non-solid medium. In various embodiments, the RF circuitry 1502 may include switches, filters, amplifiers, etc. to facilitate the communication with the wireless network. The RF circuitry 1502 may include a receive signal path which may include circuitry to down-convert RF signals received from the FEM circuitry 1532 and provide baseband signals to the baseband circuitry 1504. The RF circuitry 1502 may also include a transmit signal path which may include circuitry to up-convert baseband signals provided by the baseband circuitry 1504 and provide RF output signals to the FEM circuitry 1532 for transmission.

In some embodiments, the receive signal path of the RF circuitry 1502 may include mixer circuitry 1522, amplifier circuitry 1524 and filter circuitry 1526. In some embodiments, the transmit signal path of the RF circuitry 1502 may include filter circuitry 1526 and mixer circuitry 1522. The RF circuitry 1502 may also include synthesizer circuitry 1528 for synthesizing a frequency for use by the mixer circuitry 1522 of the receive signal path and the transmit signal path. In some embodiments, the mixer circuitry 1522 of the receive signal path may be configured to down-convert RF signals received from the FEM circuitry 1532 based on the synthesized frequency provided by synthesizer circuitry 1528. The amplifier circuitry 1524 may be configured to amplify the down-converted signals and the filter circuitry 1526 may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, the mixer circuitry 1522 of the receive signal path may comprise passive mixers, although the scope of the embodiments is not limited in this respect.

In some embodiments, the mixer circuitry 1522 of the transmit signal path may be configured to up-convert input baseband signals based on the synthesized frequency provided by the synthesizer circuitry 1528 to generate RF output signals for the FEM circuitry 1532. The baseband signals may be provided by the baseband circuitry 1504 and may be filtered by the filter circuitry 1526.

In some embodiments, the mixer circuitry 1522 of the receive signal path and the mixer circuitry 1522 of the transmit signal path may include two or more mixers and may be arranged for quadrature downconversion and upconversion, respectively. In some embodiments, the mixer circuitry 1522 of the receive signal path and the mixer circuitry 1522 of the transmit signal path may include two or more mixers and may be arranged for image rejection (e.g., Hartley image rejection). In some embodiments, the mixer circuitry 1522 of the receive signal path and the mixer circuitry 1522 may be arranged for direct downconversion and direct upconversion, respectively. In some embodiments, the mixer circuitry 1522 of the receive signal path and the mixer circuitry 1522 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1502 may include analog-to-digital converter (ADC) and digital-to-analog converter (DAC) circuitry and the baseband circuitry 1504 may include a digital baseband interface to communicate with the RF circuitry 1502.

In some dual-mode embodiments, a separate radio IC circuitry may be provided for processing signals for each spectrum, although the scope of the embodiments is not limited in this respect.

In some embodiments, the synthesizer circuitry 1528 may be a fractional-N synthesizer or a fractional N/N+1 synthesizer, although the scope of the embodiments is not limited in this respect as other types of frequency synthesizers may be suitable. For example, synthesizer circuitry 1528 may be a delta-sigma synthesizer, a frequency multiplier, or a synthesizer comprising a phase-locked loop with a frequency divider.

The synthesizer circuitry 1528 may be configured to synthesize an output frequency for use by the mixer circuitry 1522 of the RF circuitry 1502 based on a frequency input and a divider control input. In some embodiments, the synthesizer circuitry 1528 may be a fractional N/N+1 synthesizer.

In some embodiments, frequency input may be provided by a voltage controlled oscillator (VCO), although that is not a requirement. Divider control input may be provided by either the baseband circuitry 1504 or the application circuitry 1506 (such as an applications processor) depending on the desired output frequency. In some embodiments, a divider control input (e.g., N) may be determined from a look-up table based on a channel indicated by the application circuitry 1506.

Synthesizer circuitry 1528 of the RF circuitry 1502 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1528 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1502 may include an IQ/polar converter.

The FEM circuitry 1532 may include a receive signal path which may include circuitry configured to operate on RF signals received from one or more antennas 1530, amplify the received signals and provide the amplified versions of the received signals to the RF circuitry 1502 for further processing. The FEM circuitry 1532 may also include a transmit signal path which may include circuitry configured to amplify signals for transmission provided by the RF circuitry 1502 for transmission by one or more of the one or more antennas 1530. In various embodiments, the amplification through the transmit or receive signal paths may be done solely in the RF circuitry 1502, solely in the FEM circuitry 1532, or in both the RF circuitry 1502 and the FEM circuitry 1532.

In some embodiments, the FEM circuitry 1532 may include a TX/RX switch to switch between transmit mode and receive mode operation. The FEM circuitry 1532 may include a receive signal path and a transmit signal path. The receive signal path of the FEM circuitry 1532 may include an LNA to amplify received RF signals and provide the amplified received RF signals as an output (e.g., to the RF circuitry 1502). The transmit signal path of the FEM circuitry 1532 may include a power amplifier (PA) to amplify input RF signals (e.g., provided by the RF circuitry 1502), and one or more filters to generate RF signals for subsequent transmission (e.g., by one or more of the one or more antennas 1530).

In some embodiments, the PMC 1534 may manage power provided to the baseband circuitry 1504. In particular, the PMC 1534 may control power-source selection, voltage scaling, battery charging, or DC-to-DC conversion. The PMC 1534 may often be included when the device 1500 is capable of being powered by a battery, for example, when the device 1500 is included in a UE. The PMC 1534 may increase the power conversion efficiency while providing desirable implementation size and heat dissipation characteristics.

FIG. 15 shows the PMC 1534 coupled only with the baseband circuitry 1504. However, in other embodiments, the PMC 1534 may be additionally or alternatively coupled with, and perform similar power management operations for, other components such as, but not limited to, the application circuitry 1506, the RF circuitry 1502, or the FEM circuitry 1532.

In some embodiments, the PMC 1534 may control, or otherwise be part of, various power saving mechanisms of the device 1500. For example, if the device 1500 is in an RRC_Connected state, where it is still connected to the RAN node as it expects to receive traffic shortly, then it may enter a state known as Discontinuous Reception Mode (DRX) after a period of inactivity. During this state, the device 1500 may power down for brief intervals of time and thus save power.

If there is no data traffic activity for an extended period of time, then the device 1500 may transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1506 and processors of the baseband circuitry 1504 may be used to execute elements of one or more instances of a protocol stack. For example, processors of the baseband circuitry 1504, alone or in combination, may be used to execute Layer 3, Layer 2, or Layer 1 functionality, while processors of the application circuitry 1506 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 16:
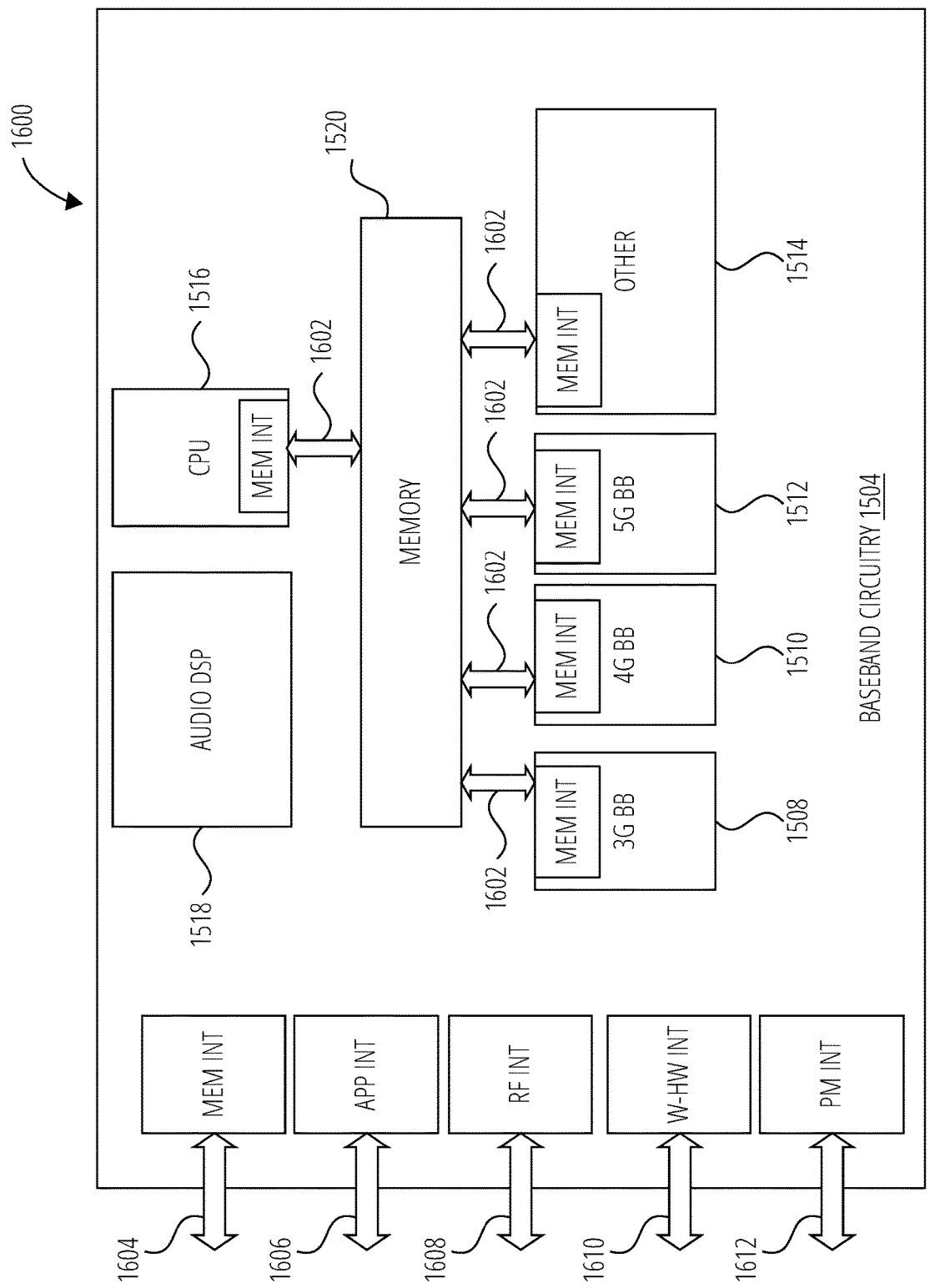
FIG. 16 illustrates example interfaces in accordance with one embodiment.

FIG. 16 illustrates example interfaces 1600 of baseband circuitry in accordance with some embodiments. As discussed above, the baseband circuitry 1504 of FIG. 15 may comprise 3G baseband processor 1508, 4G baseband processor 1510, 5G baseband processor 1512, other baseband processor(s) 1514, CPU 1516, and a memory 1520 utilized by said processors. As illustrated, each of the processors may include a respective memory interface 1602 to send/receive data to/from the memory 1520.

The baseband circuitry 1504 may further include one or more interfaces to communicatively couple to other circuitries/devices, such as a memory interface 1604 (e.g., an interface to send/receive data to/from memory external to the baseband circuitry 1504), an application circuitry interface 1606 (e.g., an interface to send/receive data to/from the application circuitry 1506 of FIG. 15), an RF circuitry interface 1608 (e.g., an interface to send/receive data to/from RF circuitry 1502 of FIG. 15), a wireless hardware connectivity interface 1610 (e.g., an interface to send/receive data to/from Near Field Communication (NFC) components, Bluetooth® components (e.g., Bluetooth® Low Energy), Wi-Fi® components, and other communication components), and a power management interface 1612 (e.g., an interface to send/receive power or control signals to/from the PMC 1534.

Figure 17:
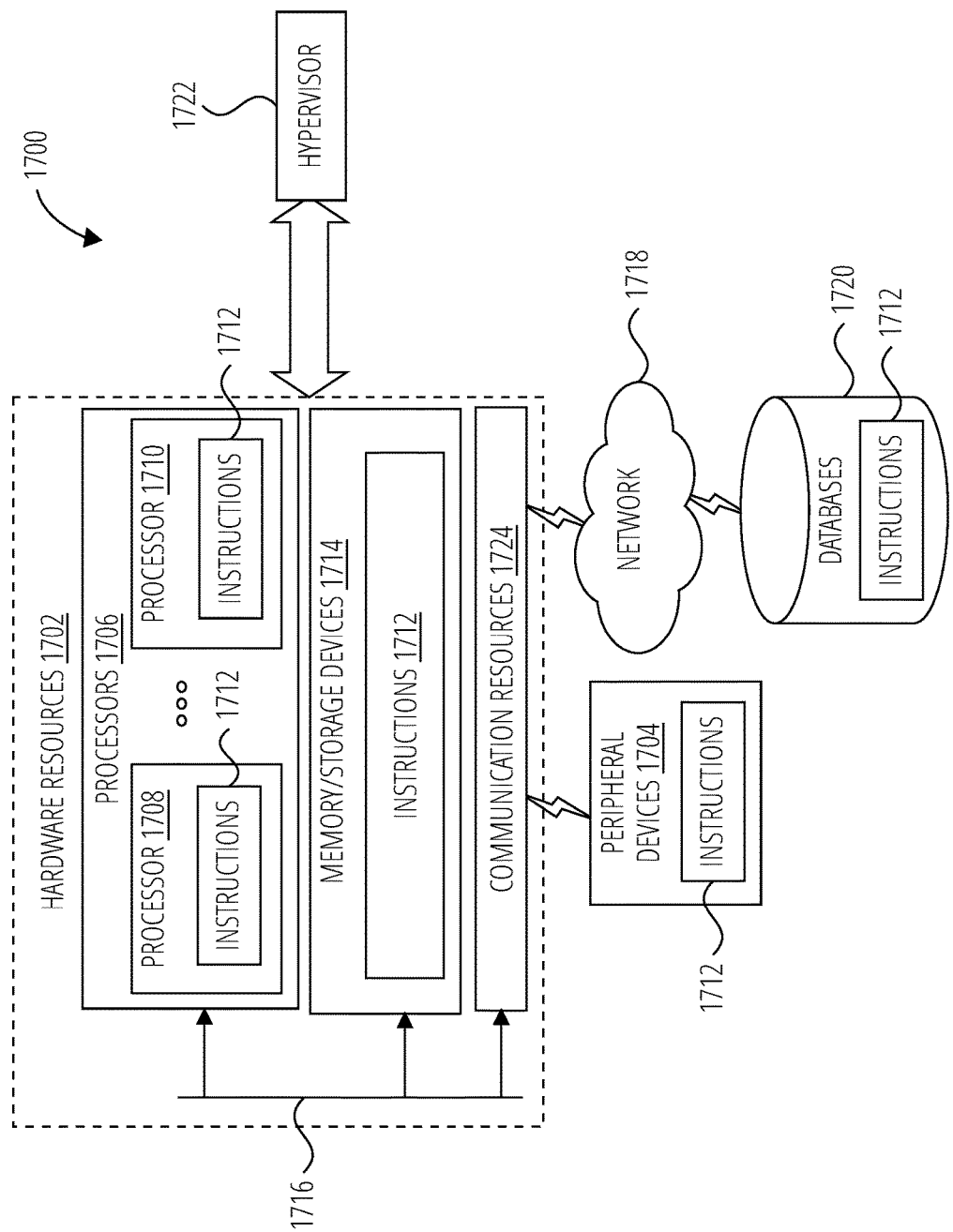
FIG. 17 illustrates components in accordance with one embodiment.

FIG. 17 is a block diagram illustrating components 1700, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1702 including one or more processors 1706 (or processor cores), one or more memory/storage devices 1714, and one or more communication resources 1724, each of which may be communicatively coupled via a bus 1716. For embodiments where node virtualization (e.g., NFV) is utilized, a hypervisor 1722 may be executed to provide an execution environment for one or more network slices/sub-slices to utilize the hardware resources 1702.

The processors 1706 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1708 and a processor 1710.

The memory/storage devices 1714 may include main memory, disk storage, or any suitable combination thereof. The memory/storage devices 1714 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1724 may include interconnection or network interface components or other suitable devices to communicate with one or more peripheral devices 1704 or one or more databases 1720 via a network 1718. For example, the communication resources 1724 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1712 may comprise software, a program, an application, an applet, an app, or other executable code for causing at least any of the processors 1706 to perform any one or more of the methodologies discussed herein. The instructions 1712 may reside, completely or partially, within at least one of the processors 1706 (e.g., within the processor's cache memory), the memory/storage devices 1714, or any suitable combination thereof. Furthermore, any portion of the instructions 1712 may be transferred to the hardware resources 1702 from any combination of the peripheral devices 1704 or the databases 1720. Accordingly, the memory of the processors 1706, the memory/storage devices 1714, the peripheral devices 1704, and the databases 1720 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method for wireless communication by a base station, comprising: determining resources for measuring beams and reporting measured beam information, the resources being configured for a first user equipment (UE) of a plurality of coordinated UEs; transmitting the determined resources to the first UE via radio resource control (RRC) or medium access control-control element (MAC CE); and decoding measured beam information received from the first UE for configuring beam sharing between multiple UEs of the plurality of coordinated UEs.

Example 2 is the method of Example 1, further comprising: configuring the resources for measuring beams and reporting measured beams for each of the plurality of coordinated UEs; and dynamically indicating to the first UE that the first UE is to measure one or more beams and report to the base station on the one or more beams using the configured resources.

Example 3 is a method for wireless communication by a base station, comprising: determining resources for measuring beams and reporting measured beam information, the resources being configured for two or more user equipments (UE) of a plurality of coordinated UEs transmitting the determined resources to the two or more UEs via radio resource control (RRC) or medium access control-control element (MAC CE); and decoding measured beam information received from at least a subset of the plurality of coordinated UEs for configuring beam sharing between multiple UEs of the plurality of coordinated UEs.

Example 4 is the method of Example 3, wherein the resources are configured for each UE of the plurality of coordinated UEs to measure a subset of a plurality of possible beams.

Example 5 is the method of Example 3, wherein the resources are configured for each UE of the plurality of coordinated UEs to report on a subset of a plurality of possible beams.

Example 6 is the method of Example 3, wherein the resources are configured for each UE of the plurality of coordinated UEs to measure and report with respect to each beam of a plurality of possible beams.

Example 7 is the method of Example 6, further comprising: dynamically reconfiguring the resources to reduce or increase a number of beams of the plurality of possible beams for which at least one UE of the plurality of coordinated UEs is to measure and report, dynamically reconfiguring being performed by the base station via MAC CE or downlink control information (DCI).

Example 8 is the method of Example 3, wherein any given beam measured and reported by any of the plurality of coordinated UEs are configured to determine a known or unknown status for a transmission configuration indicator (TCI) for the given beam for each of the plurality of coordinated UEs.

Example 9 is a method for wireless communication by a base station, comprising: determining resources for measuring beams, the resources for measuring beams being configured for two or more user equipments (UE) of a plurality of coordinated UEs; transmitting the determined resources for measuring beams to the two or more UEs via radio resource control (RRC); determining resources for reporting measured beam information, the resources for reporting measured beam information being configured for a first UE of the plurality of coordinated UEs; transmitting the determined resources for reporting measured beam information to the first UE; and decoding measured beam information received from the first UE for configuring beam sharing between multiple UEs of the plurality of coordinated UEs.

Example 10 is the method of Example 9, wherein transmitting the resources for reporting measured beam information is performed by the base station via RRC for periodic reporting, via RRC or medium access control-control element (MAC CE) for semi-persistent reporting, and via RRC, MAC CE, or downlink control information (DCI) for aperiodic reporting.

Example 11 is a method for wireless communication by a user equipment (UE), comprising: decoding, by a first UE of a plurality of coordinated UEs, beam indication information corresponding to a first beam to be shared by multiple UEs of the plurality of coordinated UEs, the beam indication information being received by the first UE via medium access control-control element (MAC CE) or downlink control information (DCI); and encoding, at the first UE, a communication associated with the first beam for two or more of the plurality of coordinated UEs to thereby allow one or more of the plurality of coordinated UEs to update to the first beam.

Example 12 is a method for wireless communication by a base station, comprising: encoding, by the base station, beam indication information corresponding to a first beam to be shared by multiple user equipments (UEs) of a plurality of coordinated UEs, the beam indication information being encoded for transmission to two or more of the plurality of coordinated UEs via medium access control-control element (MAC CE) or downlink control information (DCI); and decoding a communication from at least one UE of the plurality of coordinated UEs, the communication being configured to indicate success or failure associated with the at least one UE decoding the encoded beam indication information.

Example 13 is the method of Example 12, wherein the beam indication information is encoded based on a radio network temporary identifier (RNTI) configured for the plurality of coordinated UEs.

Example 14 is the method of Example 12, wherein the at least one UE comprises a single UE of the plurality of coordinated UEs.

Example 15 is the method of Example 14, wherein the communication indicates success or failure for each of the plurality of coordinated UEs.

Example 16 is the method of Example 12, wherein the at least one UE comprises each of the plurality of coordinated UEs.

Example 17 is the method of Example 16, wherein each given UE of the plurality of coordinated UEs only send the communication when the given UE has successfully decoded the encoded beam indication information.

Example 18 is the method of Example 16, wherein each given UE of the plurality of coordinated UEs only send the communication when the given UE has failed to decode the encoded beam indication information.

Example 19 is a method for wireless communication by a user equipment (UE), comprising: decoding beam indication information corresponding to a first beam to be shared by multiple UEs of a plurality of coordinated UEs, the beam indication information being received from a base station; and identifying that at least one of the plurality of coordinated UEs has failed to decode the beam indication information; and in response to identifying the at least one coordinated UE has failed, encoding a beam failure recovery request for transmission to the base station.

Example 20 is the method of Example 19, wherein a single UE encodes the beam failure recovery request for transmission regardless of an amount of UEs of the plurality of coordinated UEs that failed to decode the beam indication information.

Example 21 is the method of Example 20, wherein the single UE receives a beam recovery response indicating new beam indication information and the single UE forwards the new beam indication information to each of the plurality of coordinated UEs.

Example 22 is the method of Example 20, wherein the single UE utilizes a medium access control-control element (MAC CE) to indicate each UE of the plurality of coordinated UEs that failed to decode the beam indication information and each UE of the plurality of coordinated UEs receives a beam recovery response indicating new beam indication information.

Example 23 is a computer program product comprising instructions which, when executed by a processor, implement steps of the method according to any one of Example 1 to Example 22.

Example 24 is an apparatus comprising means to implement the method according to any one of Example 1 to Example 22.

Example 25 may include an apparatus comprising means to perform one or more elements of a method described in or related to any of the above Examples, or any other method or process described herein.

Example 26 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 27 may include an apparatus comprising logic, modules, or circuitry to perform one or more elements of a method described in or related to any of the above Examples, or any other method or process described herein.

Example 28 may include a method, technique, or process as described in or related to any of the above Examples, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 30 may include a signal as described in or related to any of the above Examples, or portions or parts thereof.

Example 31 may include a datagram, packet, frame, segment, protocol data unit (PDU), or message as described in or related to any of the above Examples, or portions or parts thereof, or otherwise described in the present disclosure.

Example 32 may include a signal encoded with data as described in or related to any of the above Examples, or portions or parts thereof, or otherwise described in the present disclosure.

Example 33 may include a signal encoded with a datagram, packet, frame, segment, PDU, or message as described in or related to any of the above Examples, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 35 may include a computer program comprising instructions, wherein execution of the program by a processing element is to cause the processing element to carry out the method, techniques, or process as described in or related to any of the above Examples, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for wireless communication by a base station, comprising:
   determining resources for measuring beams and reporting measured beam information, the resources being configured for two or more user equipments (UE) of a plurality of coordinated UEs;
   transmitting the determined resources to the two or more UEs via radio resource control (RRC) or medium access control-control element (MAC CE); and
   decoding the measured beam information received from at least a subset of the plurality of coordinated UEs for configuring beam sharing between multiple UEs of the plurality of coordinated UEs.

2. The method of claim 1, wherein the resources are configured for each UE of the plurality of coordinated UEs to measure a subset of a plurality of possible beams.

3. The method of claim 1, wherein the resources are configured for each UE of the plurality of coordinated UEs to report on a subset of a plurality of possible beams.

4. The method of claim 1, wherein the resources are configured for each UE of the plurality of coordinated UEs to measure and report with respect to each beam of a plurality of possible beams.

5. The method of claim 4, further comprising: dynamically reconfiguring the resources to reduce or increase a number of beams of the plurality of possible beams for which at least one UE of the plurality of coordinated UEs is to measure and report, dynamically reconfiguring being performed by the base station via MAC CE or downlink control information (DCI).

6. The method of claim 1, wherein any given beam measured and reported by any of the plurality of coordinated UEs are configured to determine a known or unknown status for a transmission configuration indicator (TCI) for the any given beam for each of the plurality of coordinated UEs.

7. An apparatus for wireless communication by a base station, the apparatus comprising:
   a memory to store measured beam information; and
   one or more processors configured to cause the base station to:
      determine resources for measuring beams and reporting the measured beam information, the resources being configured for two or more user equipments (UE) of a plurality of coordinated UEs;
      transmit the determined resources to the two or more UEs via radio resource control (RRC) or medium access control-control element (MAC CE); and
      decode the measured beam information received from at least a subset of the plurality of coordinated UEs for configuring beam sharing between multiple UEs of the plurality of coordinated UEs.

8. The apparatus of claim 7, wherein the resources are configured for each UE of the plurality of coordinated UEs to measure a subset of a plurality of possible beams.

9. The apparatus of claim 7, wherein the resources are configured for each UE of the plurality of coordinated UEs to report on a subset of a plurality of possible beams.

10. The apparatus of claim 7, wherein the resources are configured for each UE of the plurality of coordinated UEs to measure and report with respect to each beam of a plurality of possible beams.

11. The apparatus of claim 10, wherein the one or more processors are further configured to cause the base station to dynamically reconfigure the resources to reduce or increase a number of beams of the plurality of possible beams for which at least one UE of the plurality of coordinated UEs is to measure and report, dynamically reconfiguring being performed by the base station via MAC CE or downlink control information (DCI).

12. The apparatus of claim 7, wherein any given beam measured and reported by any of the plurality of coordinated UEs are configured to determine a known or unknown status for a transmission configuration indicator (TCI) for the any given beam for each of the plurality of coordinated UEs.

13. A non-transitory computer-readable storage medium including instructions that, when executed by one or more processors of a base station, cause the base station to:
   determine resources for measuring beams and reporting measured beam information, the resources being configured for two or more user equipments (UE) of a plurality of coordinated UEs;
   transmit the determined resources to the two or more UEs via radio resource control (RRC) or medium access control-control element (MAC CE); and
   decode the measured beam information received from at least a subset of the plurality of coordinated UEs for configuring beam sharing between multiple UEs of the plurality of coordinated UEs.

14. The non-transitory computer-readable storage medium of claim 13, wherein the resources are configured for each UE of the plurality of coordinated UEs to measure a subset of a plurality of possible beams.

15. The non-transitory computer-readable storage medium of claim 13, wherein the resources are configured for each UE of the plurality of coordinated UEs to report on a subset of a plurality of possible beams.

16. The non-transitory computer-readable storage medium of claim 13, wherein the resources are configured for each UE of the plurality of coordinated UEs to measure and report with respect to each beam of a plurality of possible beams.

17. The non-transitory computer-readable storage medium of claim 16, wherein the instructions that, when executed by the one or more processors of the base station, further cause the base station to dynamically reconfigure the resources to reduce or increase a number of beams of the plurality of possible beams for which at least one UE of the plurality of coordinated UEs is to measure and report, dynamically reconfiguring being performed by the base station via MAC CE or downlink control information (DCI).

18. The non-transitory computer-readable storage medium of claim 13, wherein any given beam measured and reported by any of the plurality of coordinated UEs are configured to determine a known or unknown status for a transmission configuration indicator (TCI) for the any given beam for each of the plurality of coordinated UEs.

* * * * *